US012549205B2

(12) United States Patent
Cho et al.

(10) Patent No.: US 12,549,205 B2
(45) Date of Patent: Feb. 10, 2026

(54) COMMUNICATION CIRCUIT FOR AMPLIFYING SIGNAL BY USING MULTIPLE AMPLIFIERS, AND ELECTRONIC DEVICE INCLUDING SAME

(71) Applicant: SAMSUNG ELECTRONICS CO., LTD., Suwon-si (KR)

(72) Inventors: Namjun Cho, Suwon-si (KR); Hyunseok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 439 days.

(21) Appl. No.: 18/078,204

(22) Filed: Dec. 9, 2022

(65) Prior Publication Data

US 2023/0108502 A1 Apr. 6, 2023

Related U.S. Application Data

(63) Continuation of application No. PCT/KR2021/006878, filed on Jun. 2, 2021.

(30) Foreign Application Priority Data

Jun. 9, 2020 (KR) ........................ 10-2020-0069862

(51) Int. Cl.
*H04B 1/04* (2006.01)
*H04B 1/00* (2006.01)
*H04B 1/44* (2006.01)

(52) U.S. Cl.
CPC ............. *H04B 1/04* (2013.01); *H04B 1/0064* (2013.01); *H04B 1/44* (2013.01); *H04B 2001/0416* (2013.01); *H04B 2001/045* (2013.01)

(58) Field of Classification Search
CPC .... H03F 1/02; H03F 1/56; H03F 3/20; H03G 3/30; H04B 1/0064; H04B 1/04;
(Continued)

(56) References Cited

U.S. PATENT DOCUMENTS 10,439,670 B2    10/2019    Kang et al.
11,026,189 B2    6/2021    Vintola et al.
(Continued)

FOREIGN PATENT DOCUMENTS

CN    107222173 A    9/2017
EP    3281032 B1    12/2019
(Continued)

OTHER PUBLICATIONS

Search Report (PCT/ISA/210) issued Sep. 6, 2021 by the International Searching Authority for International Patent Application No. PCT/KR2021/006878.
(Continued)

*Primary Examiner* — Nguyen T Vo
(74) *Attorney, Agent, or Firm* — Sughrue Mion, PLLC

(57) ABSTRACT

In an electronic device and an operation method of the electronic device according to various embodiments, a communication circuit of the electronic device may comprise: a first transmission chain which outputs a first transmission signal through a first antenna; a second transmission chain which outputs a second transmission signal through a second antenna; a first amplifier which is electrically connected to the first transmission chain, and amplifies the first transmission signal output from the first transmission chain; and a second amplifier which is electrically connected to the second transmission chain, and amplifies the second transmission signal output from the second transmission chain, where the second amplifier is configured to have an output end connected to an output end of the first amplifier through (Continued)

a transmission line, and output the second transmission signal received from the second transmission chain to the first antenna through the transmission line. Various other embodiments may be possible.

15 Claims, 20 Drawing Sheets

(58) Field of Classification Search
CPC . H04B 1/18; H04B 1/401; H04B 1/44; H04B 2001/0416; H04B 2001/045
See application file for complete search history.

(56) References Cited

U.S. PATENT DOCUMENTS

| | | | |
|---|---|---|---|
| 2006/0246855 | A1 | 11/2006 | Kato et al. |
| 2009/0179703 | A1* | 7/2009 | Takenaka .............. H03F 1/0288 330/296 |
| 2012/0306716 | A1* | 12/2012 | Satake ..................... H04B 1/44 343/876 |
| 2014/0248843 | A1* | 9/2014 | Johansson .............. H01Q 3/267 455/103 |
| 2016/0359461 | A1 | 12/2016 | He et al. |
| 2017/0294951 | A1* | 10/2017 | Weissman ................. H03F 3/72 |
| 2019/0074871 | A1 | 3/2019 | Petersson et al. |
| 2020/0091996 | A1 | 3/2020 | Tabatabaei et al. |
| 2020/0136686 | A1 | 4/2020 | Mitsuyuki et al. |
| 2021/0234526 | A1* | 7/2021 | Kim ......................... H04B 1/40 |

FOREIGN PATENT DOCUMENTS

| | | |
|---|---|---|
| KR | 10-2019-0090322 A | 8/2019 |
| KR | 10-2020-0014794 A | 2/2020 |

OTHER PUBLICATIONS

Written Opinion (PCT/ISA/237) issued Sep. 6, 2021 by the International Searching Authority for International Patent Application No. PCT/KR2021/006878.
Office Action dated Oct. 31, 2025 issued by Korean Patent Office in Application No. 9-5-52025-105818556.
Colantonio, Paolo & Giannini, Franco & Giofre, Rocco & Piazzon, Luca. (2010). The Doherty Power Amplifier. 10.5772/8431.

* cited by examiner

COMMUNICATION CIRCUIT FOR AMPLIFYING SIGNAL BY USING MULTIPLE AMPLIFIERS, AND ELECTRONIC DEVICE INCLUDING SAME

CROSS-REFERENCE TO RELATED APPLICATIONS

This application is a bypass continuation of International Application No. PCT/KR2021/006878, filed on Jun. 2, 2021, in the Korean Intellectual Property Receiving Office, which is based on and claims priority to Korean Patent Application No. 10-2020-0069862, filed on Jun. 9, 2020 in the Korean Intellectual Property Office, the disclosures of which are incorporated herein by reference in their entireties.

BACKGROUND

1. Field

The disclosure relate to a communication circuit and an electronic device for amplifying a signal by using multiple amplifiers.

2. Description of Related Art

Various electronic devices, such as a smart phone, a tablet personal computer (PC), a portable multimedia player (PMP), a personal digital assistant (PDA), a laptop personal computer, or a wearable device, are being distributed.

Recent electronic devices may support a communication method (e.g., 5th generation wireless communications) using a higher frequency band (e.g., mmWave band). A signal of a high frequency band may have a greater degree of attenuation as the signal progresses, than that of a signal of a low frequency band. In addition, a signal of a high frequency band may have a higher signal linearity than that of a low frequency band, thereby realizing a relatively small coverage due to the higher signal linearity.

An electronic device for supporting a communication method using a signal of a relatively high frequency band may output a signal having a greater strength than that of the existing electronic device. In addition, the electronic device may include an antenna array implemented with multiple antennas in order to have wide coverage.

When a communication circuit and an electronic device including the communication circuit output a signal having a relatively large strength, power consumption may be large.

An amplifier included in the communication circuit may have low amplification efficiency due to the characteristics of a high frequency band (e.g., high peak to average power rate (PAPR)), while performing amplification of a high frequency band (e.g., 20 GHz or more). When an amplifier having a low amplification efficiency is used, power consumption may be larger.

The electronic device outputs a signal equal to or less than a minimum output required for smooth communication due to the use of an amplifier having low amplification efficiency, and thus communication performance may be deteriorated due to a lack of signal strength.

SUMMARY

Provided are a communication circuit and an electronic device including the communication circuit that may improve communication performance and reduce power consumption.

Additional aspects will be set forth in part in the description which follows and, in part, will be apparent from the description, or may be learned by practice of the presented embodiments.

According to an aspect of the disclosure, a communication circuit may include a first transmission chain configured to output a first transmission signal through a first antenna, a second transmission chain configured to output a second transmission signal through a second antenna, a first amplifier connected to the first transmission chain, and configured to amplify the first transmission signal output from the first transmission chain, and a second amplifier connected to the second transmission chain, and including a second output terminal connected to a first output terminal of the first amplifier through a transmission line, the second amplifier being configured to amplify the second transmission signal output from the second transmission chain, and output the amplified second transmission signal to the first antenna through the transmission line.

The communication circuit may further include a voltage control circuit configured to control a bias voltage applied to at least one of the first amplifier and the second amplifier, and at least one of the first amplifier and the second amplifier is configured to operate in a first operation mode or a second operation mode having an output lower than that of the first operation mode, based on at least one of a strength of the first transmission signal and a strength of the second transmission signal.

The first operation mode may correspond to an operation mode in which an amplification gain of the first amplifier is greater than an amplification gain of the second amplifier.

The first amplifier may be in a class-C operation mode, and the second amplifier may be in a class-AB operation mode.

The second operation mode may correspond to an operation mode in which the first amplifier is in an inactive state and the second amplifier is in an active state.

The second amplifier may be in a class-AB operation mode.

The transmission line may have a length of ¼ of a wavelength of a signal transmitted through the transmission line.

The communication circuit may further include a first reception chain configured to receive a signal through the first antenna, a first switch configured to connect the first transmission chain or the first reception chain to the first antenna, and a first impedance matching circuit connected between the first switch and the first output terminal of the first amplifier, and configured to prevent a signal output from the second amplifier from being transmitted to the first amplifier while the first amplifier is inactive.

The communication circuit may further include a second reception chain configured to receive a signal through the second antenna, a second switch configured to connect the second transmission chain or the second reception chain to the second antenna, and a second impedance matching circuit connected between the second switch and the second output terminal of the second amplifier and configured to prevent a signal output from the second amplifier from being transmitted to the second switch in a state in which the second transmission chain is not connected to the second antenna by the second switch.

The first output terminal of first amplifier may be connected to the second output terminal of the second amplifier through the transmission line, and the first amplifier may be further configured to output the first transmission signal received from the first transmission chain to the second antenna through the transmission line.

According to an aspect of the disclosure, an electronic device may include a communication processor and a communication circuit connected to the communication processor. The communication circuit may include a first substrate including a first surface on which at least one first antenna is implemented and a second surface oriented in a direction opposite to the first surface, and a second antenna provided on the first substrate. The second surface may include an integrated circuit including a first transmission chain configured to output a first transmission signal through the at least one first antenna and a second transmission chain configured to output a second transmission signal through the second antenna, a first amplifier connected to the first transmission chain, and configured to amplify the first transmission signal output from the first transmission chain, and a second amplifier connected to the second transmission chain, and including a second output terminal connected to a first output terminal of the first amplifier through a transmission line, the second amplifier being configured to amplify the second transmission signal output from the second transmission chain and output the amplified second transmission signal to the at least one first antenna through the transmission line.

The communication circuit may further include a voltage control circuit configured to control a bias voltage applied to at least one of the first amplifier and the second amplifier, and at least one of the first amplifier and the second amplifier may be configured to operate in a first operation mode or a second operation mode having an output lower than that of the first operation mode, based on at least one of a strength of the first transmission signal and a strength of the second transmission signal.

The first operation mode may correspond to an operation mode in which an amplification gain of the first amplifier is greater than an amplification gain of the second amplifier.

The first amplifier may be in a class-C operation mode, and the second amplifier may be in a class-AB operation mode.

The second operation mode may correspond to an operation mode in which the first amplifier is in an inactive state and the second amplifier is in an active state.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
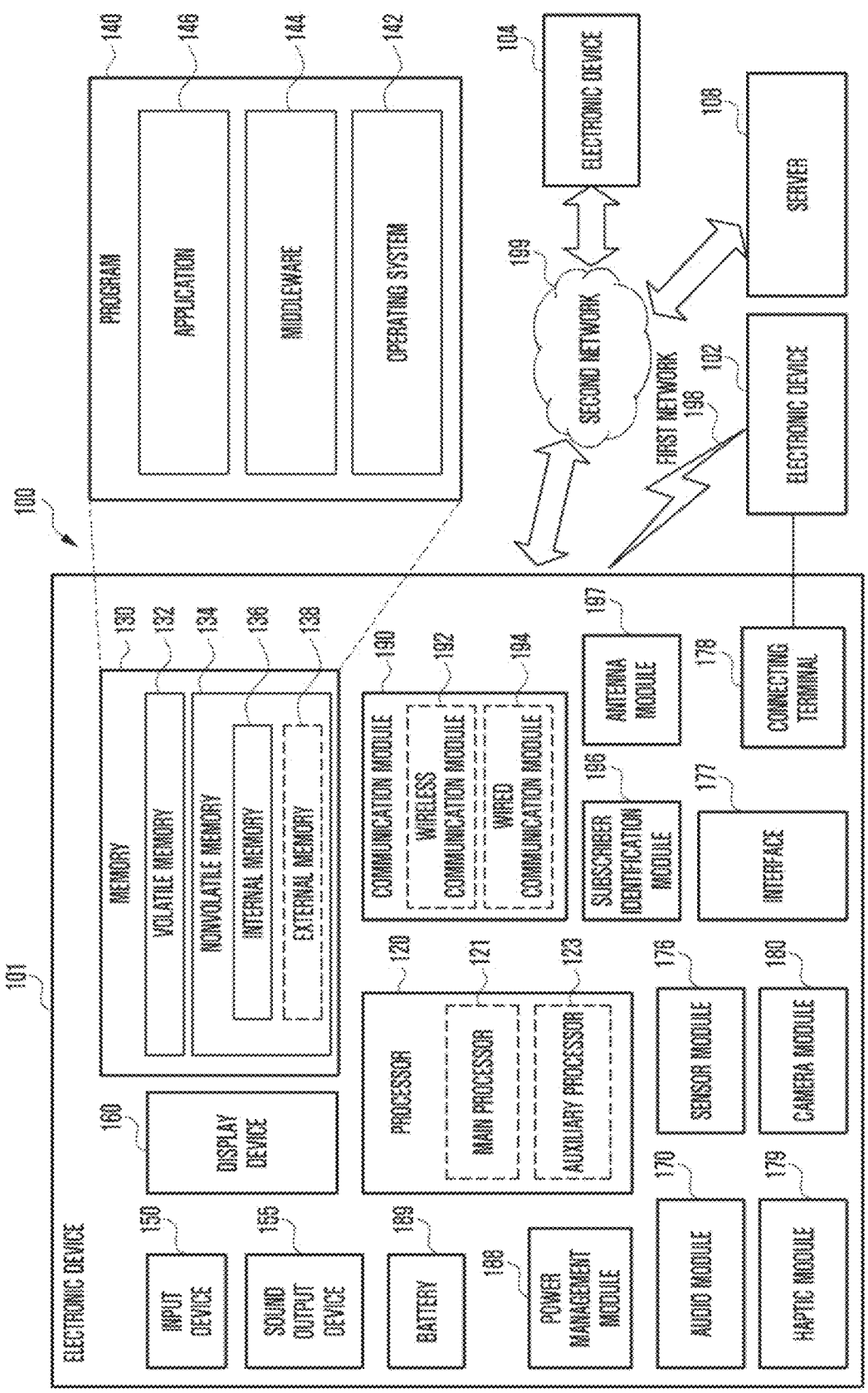
FIG. 1 is a block diagram of an electronic device according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
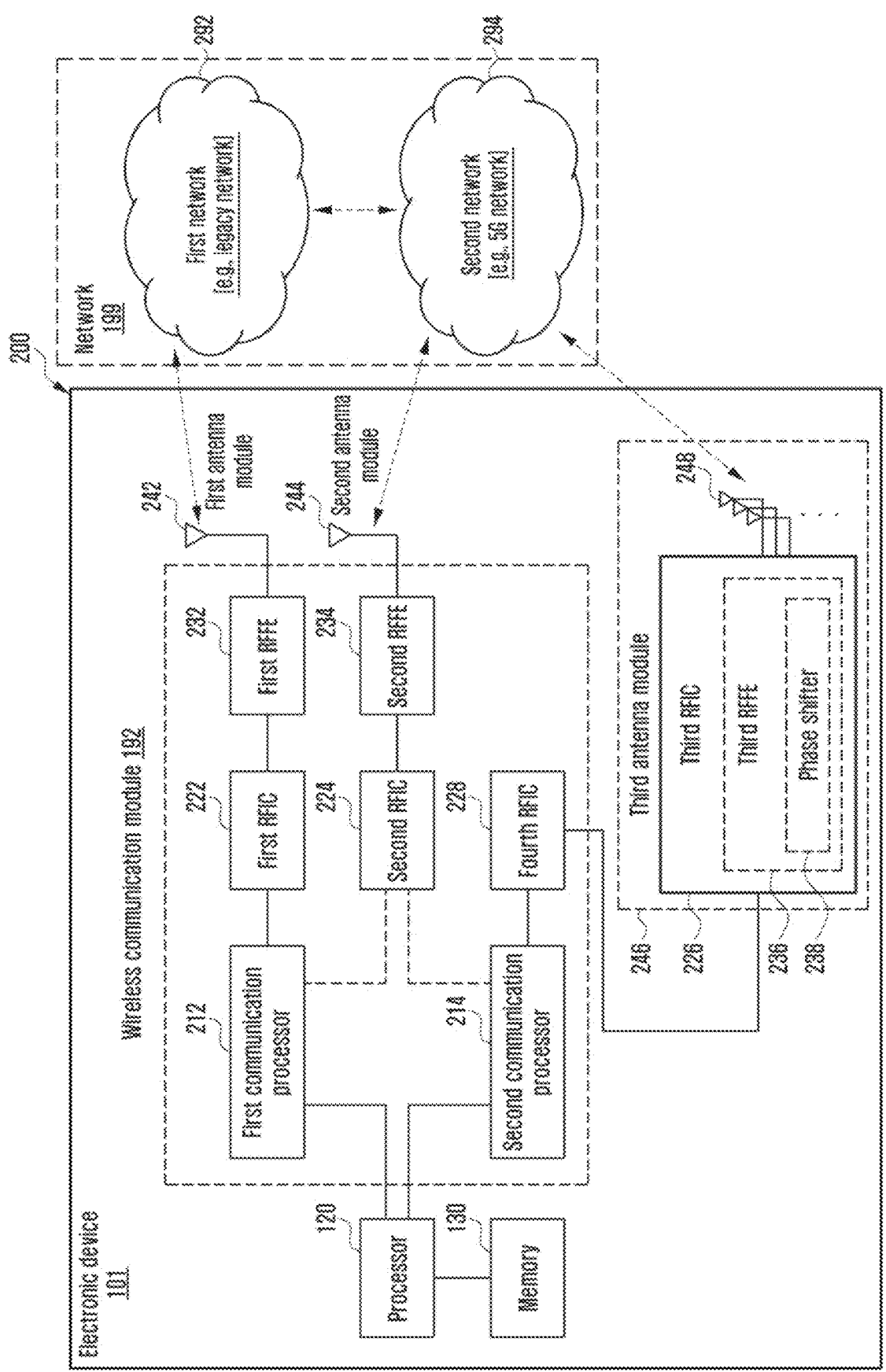
FIG. 2 is a block diagram of an electronic device for supporting legacy network communication and 5th generation (5G) network communication according to various embodiments of the disclosure.

FIG. 2 is a block diagram illustrating an electronic device in a network environment including a plurality of cellular networks according to an embodiment of the disclosure.

Referring to FIG. 2, the electronic device 101 may include a first communication processor 212, second communication processor 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to another embodiment, the electronic device 101 may further include at least one of the components described with reference to FIG. 1, and the second network 199 may further include at least one other network. According to one embodiment, the first communication processor 212, second communication processor 214, first RFIC 222, second RFIC 224, fourth RFIC 228, first RFFE 232, and second RFFE 234 may form at least part of the wireless communication module 192. According to another embodiment, the fourth RFIC 228 may be omitted or included as part of the third RFIC 226.

The first communication processor 212 may establish a communication channel of a band to be used for wireless communication with the first cellular network 292 and support legacy network communication through the established communication channel. According to various embodiments, the first cellular network may be a legacy network including a second generation (2G), 3G, 4G, or long term evolution (LTE) network. The second communication processor 214 may establish a communication channel corresponding to a designated band (e.g., about 6 GHz to about 60 GHz) of bands to be used for wireless communication with the second cellular network 294, and support fifth generation (5G) network communication through the established communication channel. According to various embodiments, the second cellular network 294 may be a 5G network defined in 3rd generation partnership project (3GPP). Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to one embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to one embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to one embodiment, the first RFIC 222 and the second RFIC 224 may be implemented into at least part of a single package or a single chip. According to one embodiment, the first RFFE 232 and the second RFFE 234 may be implemented into at least part of a single package or a single chip. According to one embodiment, at least one of the first antenna module 242 or the second antenna module 244 may be omitted or may be combined with another antenna module to process RF signals of a corresponding plurality of bands.

According to one embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to one embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
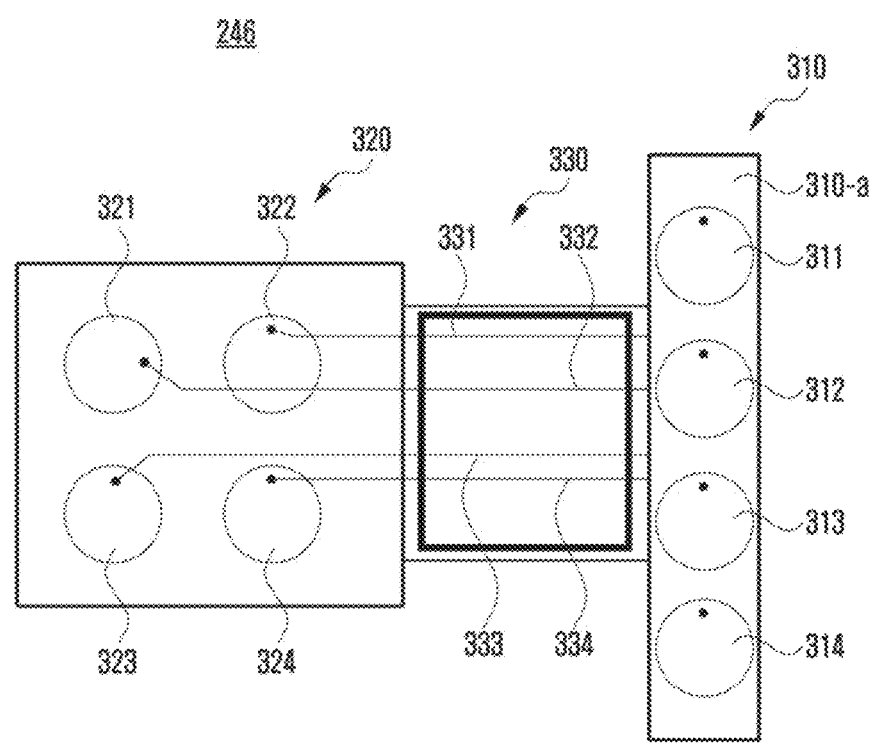
FIGS. 3A, 3B, and 3C are diagrams of an antenna module including an antenna array and a communication circuit of an electronic device according to various embodiments of the disclosure.
Figure 3B:
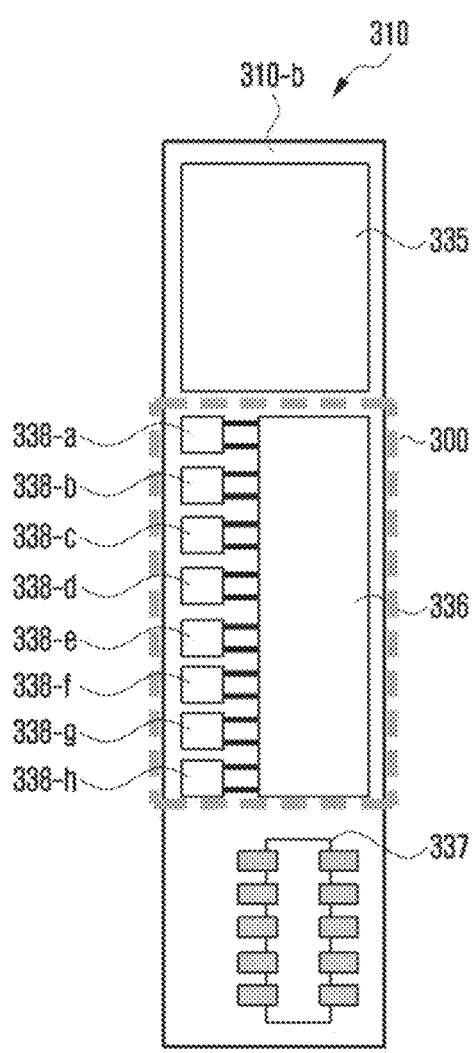
Figure 3C:
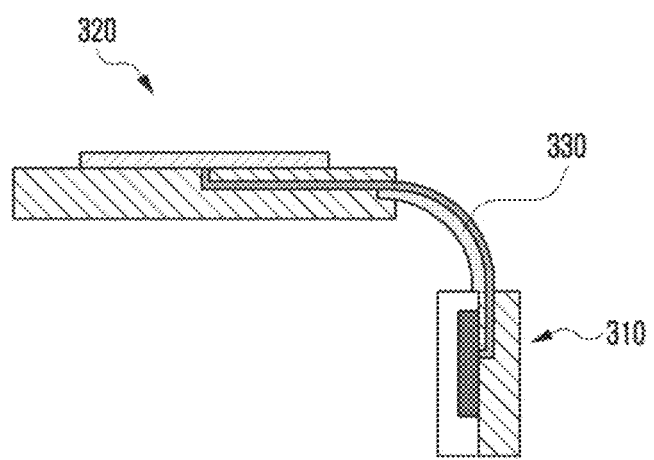

FIGS. 3A, 3B, and 3C are diagrams of an antenna module 246 including an antenna array and a communication circuit of an electronic device according to various embodiments of the disclosure.

An antenna module (e.g., the third antenna module 246 of FIG. 2) of an electronic device (e.g., the electronic device 101 of FIG. 1) according to various embodiments of the disclosure may include a first substrate 310, a second substrate 320, and/or a third substrate 330.

According to various embodiments of the disclosure, the first substrate 310 may include one or more first antennas (e.g., the antenna 248 of FIGS. 2) 311, 312, 313, and 314. For example, the first antennas 311, 312, 313, and 314 may be arranged on a first surface 310-*a* of the first substrate 310, and may be implemented as a conductive patch or pattern. The first antennas 311, 312, 313, and 314 may be antennas configured to form an antenna array having a specific shape. The first antennas 311, 312, 313, and 314 may radiate a signal output from a wireless communication integrated circuit (e.g., the RFIC 226 of FIG. 2 or a wireless communication integrated circuit 336 of FIG. 3B), or may receive a signal from the outside and transmit the received signal to the wireless communication integrated circuit 336. In FIG. 3A, an array pattern implemented by the first antennas 311, 312, 313, and 314 is shown as a pattern in the form of one in horizontal and four in vertical (1×4), and may be implemented in various types of patterns without being limited to the pattern shown in FIG. 3A.

According to various embodiments of the disclosure, a second substrate 320 may include one or more second antennas (e.g., the antenna 248 of FIGS. 2) 321, 322, 323, and 324. For example, the second antennas 321, 322, 323, and 324 may be arranged on one surface of the second substrate 320, and may be implemented as a conductive patch or pattern. The second antennas 321, 322, 323, and 324 may be antennas configured to form an antenna array having a specific shape. The second antennas 321, 322, 323, and 324 may radiate a signal output from a wireless communication integrated circuit (e.g., the RFIC 226 of FIG. 2 or the wireless communication integrated circuit 336 of FIG. 3B), or may receive a signal from the outside and transmit the received signal to the wireless communication integrated circuit 336. In FIG. 3B, an array pattern implemented by the second antennas 321, 322, 323, and 324 is shown as a pattern in the form of two in horizontal and two in vertical (2×2), and may be implemented in various types of patterns without being limited to the pattern illustrated in FIG. 3A.

According to various embodiments of the disclosure, the first substrate 310 may be configured to arrange, on a second surface **310-*b* oriented in the opposite direction to the first surface 310-*a*, various components (e.g., a PMIC 335, a wireless communication integrated circuit 336, a connector 337, or amplifiers 338-*a*, 338-*b*, 338-*c*, 338-*d*, 338-*e*, 338-*f*, 338-*g*, and 338-*h*) configured to generate or amplify a signal to be output using the first antennas 311, 312, 313 and 314 and/or the second antennas 321, 322, 323, and 324. Various components disposed on the second surface will be described later with reference to FIG. 3C**.

According to various embodiments of the disclosure, the antenna module 246 may include a third substrate 330 configured to electrically connect the first substrate 310 and the second substrate 320. The third substrate 330 may be implemented with wires 331, 332, 333, and 334 for electrically connecting the first antennas 311, 312, 313, and 314 and the wireless communication integrated circuit 336, which are formed on the first substrate 310.

FIG. 3B illustrates the second surface **310-*b* of the first substrate 310. Referring to FIG. 3B, a PMIC 335 configured to control power supply, a wireless communication integrated circuit 336 configured to perform an operation of increasing the frequency of a signal to be radiated through the first antennas 311, 312, 313, and 314 and/or the second antennas 321, 322, 323, and 324 or amplifying the signal to be radiated therethrough, a connector 337 connected to a communication processor (e.g., the first communication processor 212 of FIG. 2 or the second communication processor 214 of FIG. 2) and/or an application processor (e.g., the processor 120 of FIG. 1), or amplifiers 338-*a*, 338-*b*, 338-*c*, 338-*d*, 338-*e*, 338-*f*, 338-*g*, and 338-*h* configured to amplify a signal output from the wireless communication integrated circuit 336 may be arranged on the second surface 310-*b* of the first substrate 310**.

According to various embodiments of the disclosure, a communication circuit 300 may include a wireless communication integrated circuit 336 and/or amplifiers **338-*a*, 338-*b*, 338-*c*, 338-*d*, 338-*e*, 338-*f*, 338-*g*, and 338-*h***.

In FIG. 3B, the first surface **310-*a* and the second surface 310-*b* illustrated as parallel to each other, but the relationship between the first surface 310-*a* and the second surface 310-*b* may be varied. For example, the first surface 310-*a* and the second surface 310-*b*** may be shown as being vertical.

Referring to FIG. 3C, in the antenna module 246, according to a direction in which a beam is formed using the first antennas 311, 312, 313, and 314 and/or the second antennas 321, 322, 323, and 324, the first substrate 310 and the second substrate 320 may be arranged in a non-parallel shape (e.g., as being vertical). For example, the first substrate 310 and the second substrate 320 may be arranged as being substantially vertical. For example, a third substrate 330 may be implemented in a curved shape in the arrangement structure of the first substrate 310 and the second substrate 320. As another example, the third substrate 330 may be implemented as a flexible printed circuit substrate (FPCB).

According to various embodiments of the disclosure, since the distance between the components arranged on the first substrate 310 and the second antennas 321, 322, 323, and 324 arranged on the second substrate 320 is longer by the third substrate 330, the strength of a signal, which is output from the wireless communication integrated circuit 336 and transmitted to the second antennas 321, 322, 323, and 324 through the wires 331, 332, 333, and 334 of the third substrate 330, may be reduced. For example, the strength of the signal output from the wireless communication integrated circuit 336 and transmitted to the second antennas 321, 322, 323, and 324 may be reduced by about 2 dB or more.

According to various embodiments of the disclosure, in order to improve a decrease in the strength of a signal, which is output from the wireless communication integrated circuit 336 and transmitted to the second antennas 321, 322, 323, and 324, the amplifiers **338-*a*, 338-*b*, 338-*c*, 338-*d*, 338-*e*, 338-*f*, 338-*g*, and 338-*h* may be configured to perform amplification of the signal output from the wireless communication integrated circuit 336. The amplifiers 338-*a*, 338-*b*, 338-*c*, 338-*d*, 338-*e*, 338-*f*, 338-*g*, and 338-*h*** may be implemented using a compound semiconductor (e.g., GaAs, SiGe, or SOI) to perform high amplification of a signal or to increase the efficiency of signal amplification.

Figure 3D:
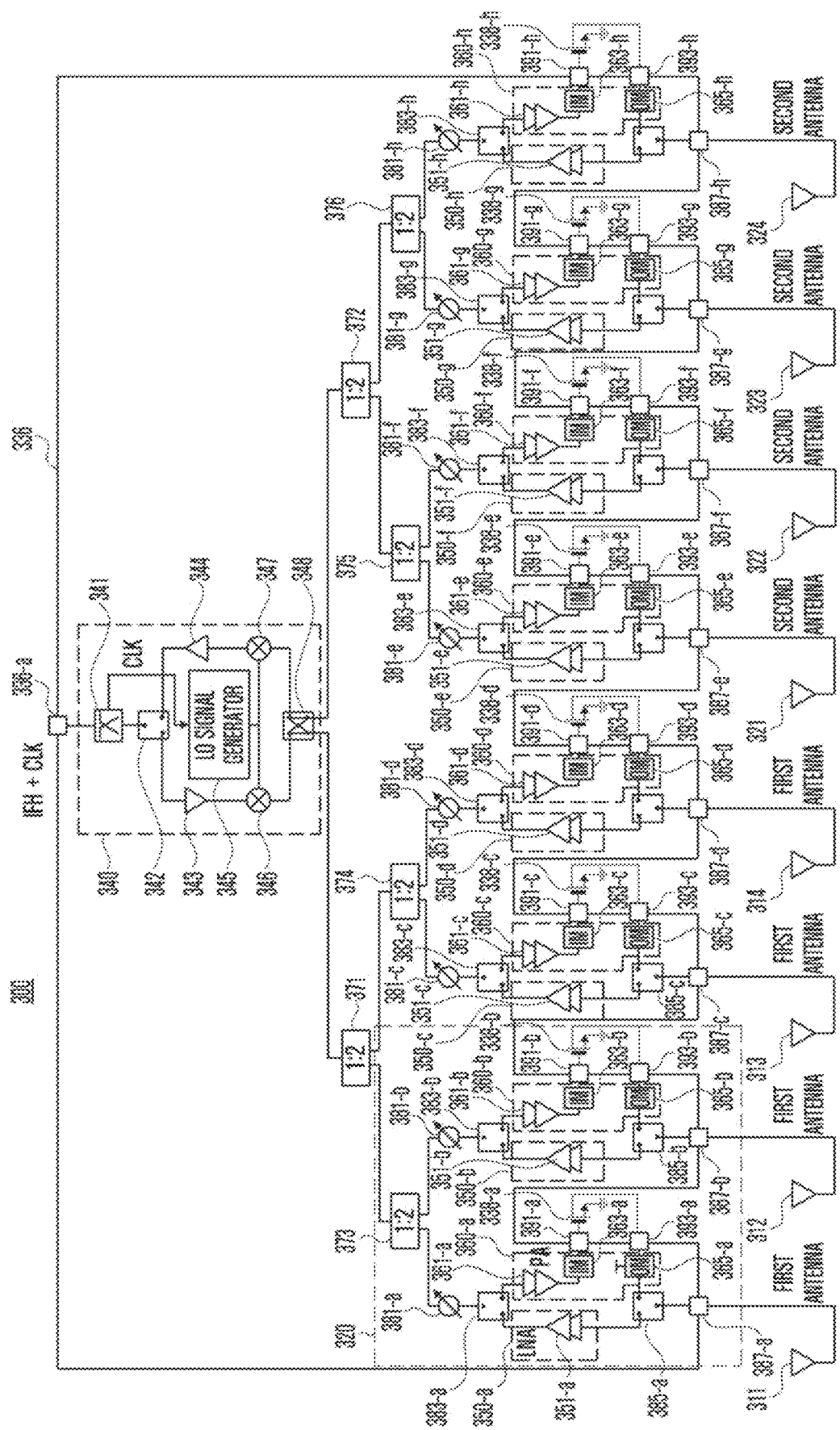
FIG. 3D is a diagram of a communication circuit of an electronic device according to various embodiments of the disclosure.

FIG. 3D is a diagram of a communication circuit of an electronic device according to various embodiments of the disclosure.

A communication circuit 300 according to various embodiments of the disclosure may include a frequency conversion circuit 340. The frequency conversion circuit 340 may include a duplexer 341 configured to separate a received signal (IF signal) in the intermediate frequency band (e.g., about 9 GHz to about 11 GHz) and a signal (local oscillator (LO) signal) used by mixers 346 and 347, from a signal in a high frequency band (e.g., 26 GHz or higher) received from the outside through at least one of reception chains **350-*a*, 350-*b*, 350-*c*, 350-*d*, 350-*e*, 350-*f*, 350-*g*, and 350-*h* and a signal received through a node 336-*a* from an intermediate frequency processing circuit (e.g., the fourth RFIC 228 in FIG. 2) of an electronic device (e.g., electronic device 101 in FIG. 1), a switch 342** configured to select a path for a signal received through at least one of the reception chains 350-*a*, 350-*b*, 350-*c*, 350-*d*, 350-*e*, 350-*f*, 350-*g*, and 350-*h* and a path for a signal to be transmitted through at least one of transmission chains 360-*a*, 360-*b*, 360-*c*, 360-*d*, 360-*e*, 360-*f*, 360-*g*, and 360-*h*; an amplifier 343 configured to amplify a signal to be transmitted through at least one of the transmission chains 360-*a*, 360-*b*, 360-*c*, 360-*d*, 360-*e*, 360-*f*, 360-*g*, and 360-*h*; an amplifier 344 configured to amplify a signal received through at least one of the reception chains 350-*a*, 350-*b*, 350-*c*, 350-*d*, 350-*e*, 350-*f*, 350-*g*, and 350-*h*, mixers 346 and 347 configured to perform an operation of converting a signal of an intermediate frequency band to a signal of a high frequency band, or converting a signal of a high frequency band to a signal of an intermediate frequency band or an LO signal generator 345 configured to generate signals for operating the mixers 346 and 347, the mixer 346 configured to convert a signal of an intermediate frequency band to be transmitted to a signal of a high frequency band; the mixer 347 configured to convert a signal of a high-frequency band, which is received through at least one of the reception chains 350-*a*, 350-*b*, 350-*c*, 350-*d*, 350-*e*, 350-*f*, 350-*g*, and 350-*h*, to a signal of an intermediate frequency band, and/or a switch 348 configured to select a path, which is configured to output or receive a signal, among the first antennas 311, 312, 313, and 314 or the second antennas 321, 322, 323, and 324. The frequency conversion circuit 340 may be included in the wireless communication integrated circuit 336.

According to various embodiments of the disclosure, the communication circuit 300 may include splitter/combiners 371, 372, 373, 374, 375, and 376 configured to combine a path of a signal received through at least one of reception chains 350-*a*, 350-*b*, 350-*c*, 350-*d*, 350-*e*, 350-*f*, 350-*g*, and 350-*h*, or separate a path of a signal to be transmitted through at least one of transmission chains 360-*a*, 360-*b*, 360-*c*, 360-*d*, 360-*e*, 360-*f*, 360-*g*, and 360-*h*. The splitter/combiners 371, 372, 373, 374, 375, and 376 may be included in the wireless communication integrated circuit 336.

According to various embodiments of the disclosure, the communication circuit 300 may include phase shifters 381-*a*, 381-*b*, 381-*c*, 381-*d*, 381-*e*, 381-*f*, 381-*g*, and 381-*h* capable of changing a phase of a signal received through at least one of the reception chains 350-*a*, 350-*b*, 350-*c*, 350-*d*, 350-*e*, 350-*f*, 350-*g*, and 350-*h* and/or a signal to be transmitted through at least one of the transmission chains 360-*a*, 360-*b*, 360-*c*, 360-*d*, 360-*e*, 360-*f*, 360-*g*, and 360-*h*. The phase shifters 381-*a*, 381-*b*, 381-*c*, 381-*d*, 381-*e*, 381-*f*, 381-*g*, and 381-*h* may be included in the wireless communication integrated circuit 336.

According to various embodiments of the disclosure, the communication circuit 300 may include switches 383-*a*, 383-*b*, 383-*c*, 383-*d*, 383-*e*, 383-*f*, 383-*g*, and 383-*h* configured to connect one chain among the reception chains 350-*a*, 350-*b*, 350-*c*, 350-*d*, 350-*e*, 350-*f*, 350-*g*, and 350-*h* and the transmission chains 360-*a*, 360-*b*, 360-*c*, 360-*d*, 360-*e*, 360-*f*, 360-*g*, and 360-*h* to the phase converters 381-*a*, 381-*b*, 381-*c*, 381-*d*, 381-*e*, 381-*f*, 381-*g*, and 381-*h*. The switches 383-*a*, 383-*b*, 383-*c*, 383-*d*, 383-*e*, 383-*f*, 383-*g*, and 383-*h* may be included in the wireless communication integrated circuit 336.

According to various embodiments of the disclosure, the communication circuit 300 is connected to the first antennas 311, 312, 313, and 314 and/or the second antennas 321, 322, 323, and 324, may include reception chains 350-*a*, 350-*b*, 350-*c*, 350-*d*, 350-*e*, 350-*f*, 350-*g*, and 350-*h* configured to receive a signal radiated from the outside. The reception chains 350-*a*, 350-*b*, 350-*c*, 350-*d*, 350-*e*, 350-*f*, 350-*g*, and 350-*h* may include various components configured to perform amplification of the received signal, converting the phase of the amplified signal and converting the frequency of the amplified signal. In FIG. 3D, the reception chains 350-*a*, 350-*b*, 350-*c*, 350-*d*, 350-*e*, 350-*f*, 350-*g*, and 350-*h* are shown as including amplifiers 351-*a*, 351-*b*, 351-*c*, 351-*d*, 351-*e*, 351-*f*, 351-*g*, and 351-*h* configured to amplify the received signal. However, the reception chains 350-*a*, 350-*b*, 350-*c*, 350-*d*, 350-*e*, 350-*f*, 350-*g*, and 350-*h* may include various components in addition to the amplifiers 351-*a*, 351-*b*, 351-*c*, 351-*d*, 351-*e*, 351-*f*, 351-*g*, and 351-*h*.

According to various embodiments of the disclosure, the communication circuit 300 may include transmission chains 360-*a*, 360-*b*, 360-*c*, 360-*d*, 360-*e*, 360-*f*, 360-*g*, and 360-*h* configured to output a signal through the first antennas 311, 312, 313, and 314 and/or the second antennas 321, 322, 323, and 324. The transmission chains 360-*a*, 360-*b*, 360-*c*, 360-*d*, 360-*e*, 360-*f*, 360-*g*, and 360-*h* may include amplifiers 361-*a*, 361-*b*, 361-*c*, 361-*d*, 361-*e*, 361-*f*, 361-*g*, and 361-*h* configured to amplify a signal in two stages, the signal obtained by converting a signal of an intermediate frequency band to a signal of a high frequency band by the frequency conversion circuit 340, input impedance matching circuits 363-*a*, 363-*b*, 363-*c*, 363-*d*, 363-*e*, 363-*f*, 363-*g*, and 363-*h* configured to perform input impedance matching of the amplifiers 338-*a*, 338-*b*, 338-*c*, 338-*d*, 338-*e*, 338-*f*, 338-*g*, and 338-*h* configured to amplify again the signal amplified by the amplifiers 361-*a*, 361-*b*, 361-*c*, 361-*d*, 361-*e*, 361-*f*, 361-*g*, and 361-*h*, and/or output impedance matching circuits 365-*a*, 365-*b*, 365-*c*, 365-*d*, 365-*e*, 365-*f*, 365-*g*, and 365-*h* configured to perform output impedance matching of the amplifiers 338-*a*, 338-*b*, 338-*c*, 338-*d*, 338-*e*, 338-*f*, 338-*g*, and 338-*h* configured to amplify again the signal amplified by the amplifiers 361-*a*, 361-*b*, 361-*c*, 361-*d*, 361-*e*, 361-*f*, 361-*g*, and 361-*h*.

According to various embodiments of the disclosure, the communication circuit 300 may include antenna ports 387-*a*, 387-*b*, 387-*c*, 387-*d*, 387-*e*, 387-*f*, 387-*g*, and 387-*h* for connecting the first antennas 311, 312, 313, and 314 and/or the second antennas 321, 322, 323, and 324 to the wireless communication integrated circuit 336.

According to various embodiments of the disclosure, the communication circuit 300 may include switches 385-*a*, 385-*b*, 385-*c*, 385-*d*, 385-*e*, 385-*f*, 385-*g*, and 385-*h* configured to connect one chain among the transmission chains 360-*a*, 360-*b*, 360-*c*, 360-*d*, 360-*e*, 360-*f*, 360-*g*, and 360-*h* and the reception chains 350-*a*, 350-*b*, 350-*c*, 350-*d*, 350-*e*, 350-*f*, 350-*g*, 350-*h* to the antenna ports 387-*a*, 387-*b*, 387-*c*, 387-*d*, 387-*e*, 387-*f*, 387-*g*, and 387-*h*.

According to various embodiments of the disclosure, the wireless communication integrated circuit 336 may include ports 391-*a*, 391-*b*, 391-*c*, 391-*d*, 391-*e*, 391-*f*, 391-*g*, and 391-*h* configured to be connected to an input terminal of the amplifiers 338-*a*, 338-*b*, 338-*c*, 338-*d*, 338-*e*, 338-*f*, 338-*g*, and 338-*h*, and ports 393-*a*, 393-*b*, 393-*c*, 393-*d*, 393-*e*, 393-*f*, 393-*g*, and 393-*h* configured to be connected to an output terminal of the amplifiers 338-*a*, 338-*b*, 338-*c*, 338-*d*, 338-*e*, 338-*f*, 338-*g*, and 338-*h*.

The communication circuit 300 shown in FIGS. 3A, 3B, 3C and 3D may increase the strength of a signal to be output, by the amplifiers 338-*a*, 338-*b*, 338-*c*, 338-*d*, 338-*e*, 338-*f*, 338-*g*, and 338-*h* configured to amplify the signal to be output, during performing signal output, and may increase the efficiency of signal output. However, when the external shape of the electronic device 101 is implemented using a material such as a ceramic material having relatively low conductivity and using a high-order modulation signal (e.g., a modulation signal using 128 quadrature amplitude modulation (QAM)), an increase in peak-to-average power ratio (PAPR) may lead to a decrease in efficiency of the amplifier.

Figure 3E:
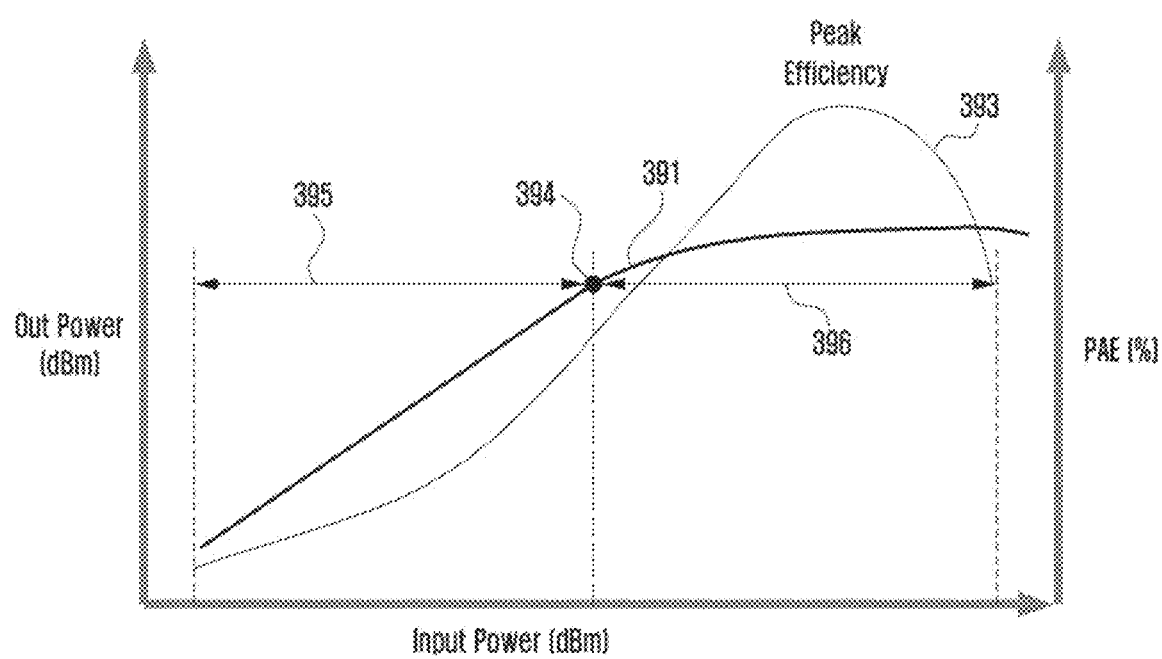
FIG. 3E is a graph illustrating an operating range and efficiency of an amplifier in a communication circuit of an electronic device according to various embodiments of the disclosure.

FIG. 3E is a graph illustrating an operating range and efficiency of an amplifier in a communication circuit of an electronic device according to various embodiments of the disclosure. FIG. 3E illustrates the magnitude 391 of an amplified signal compared to the strength of an input signal and the efficiency 393 of amplifiers 338-*a*, 338-*b*, 338-*c*, 338-*d*, 338-*e*, 338-*f*, 338-*g*, and 338-*h* according to the strength of the input signal, when power is applied to the amplifiers 338-*a*, 338-*b*, 338-*c*, 338-*d*, 338-*e*, 338-*f*, 338-*g*, and 338-*h*.

Referring to FIG. 3E, it may be identified that the strength of a signal output from the amplifiers 338-*a*, 338-*b*, 338-*c*, 338-*d*, 338-*e*, 338-*f*, 338-*g*, and 338-*h* increases as the strength of a signal input to the amplifiers 338-*a*, 338-*b*, 338-*c*, 338-*d*, 338-*e*, 338-*f*, 338-*g*, and 338-*h* increases, and when the strength of the input signal is equal to or greater than a specific strength 394, the strength of the output signal saturates. The amplifiers 338-*a*, 338-*b*, 338-*c*, 338-*d*, 338-*e*, 338-*f*, 338-*g*, and 338-*h* are available in a duration 395 in which the strength of the output signal linearly increases as the strength of the input signal increases. However, it may be identified that the efficiency of the amplifiers 338-*a*, 338-*b*, 338-*c*, 338-*d*, 338-*e*, 338-*f*, 338-*g*, and 338-*h* is greater in a duration 396, in which the amplifiers are not available, than in the duration 395 in which the strength of the output signal linearly increases as the strength of the input signal increases.

Figure 4A:
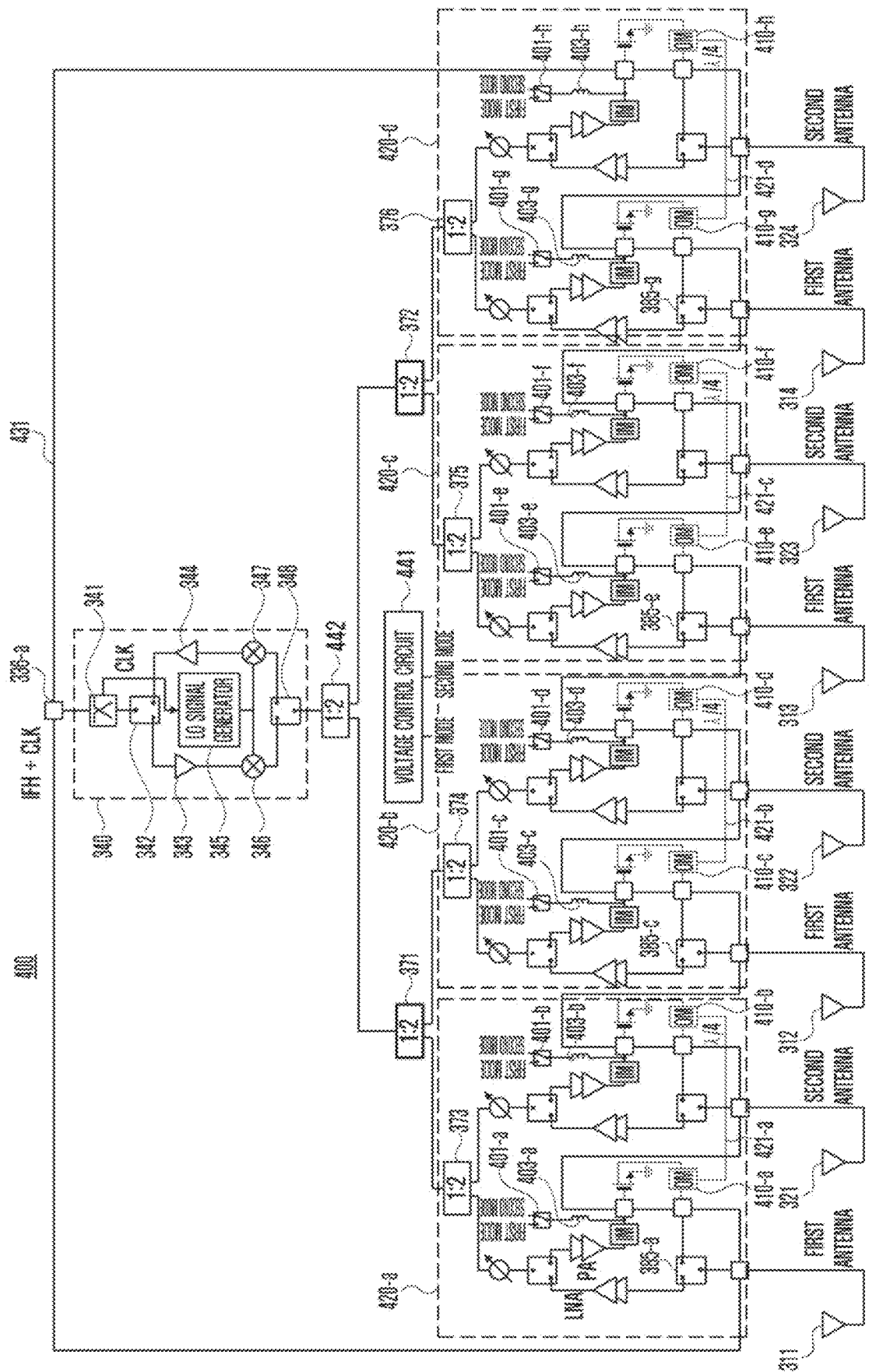
FIG. 4A is a diagram of a communication circuit of an electronic device according to various embodiments of the disclosure.

FIG. 4A is a diagram of a communication circuit of an electronic device according to various embodiments of the disclosure;

FIG. 4A illustrates a communication circuit 400, which is obtained by changing a part (e.g., the second substrate 320) of the communication circuit 300 shown in FIG. 3D to a part of the communication circuit (e.g., a part 420-*a* of a communication circuit in FIG. 4B) to which the features described in FIG. 4B to FIG. 6B are applied. For clarity, the changed parts in the communication circuit 300 shown in FIG. 3D are described below. With regard to the same configuration as that of FIG. 3D, FIG. 4A may refer to the reference numerals in FIG. 3D.

Figure 4B:
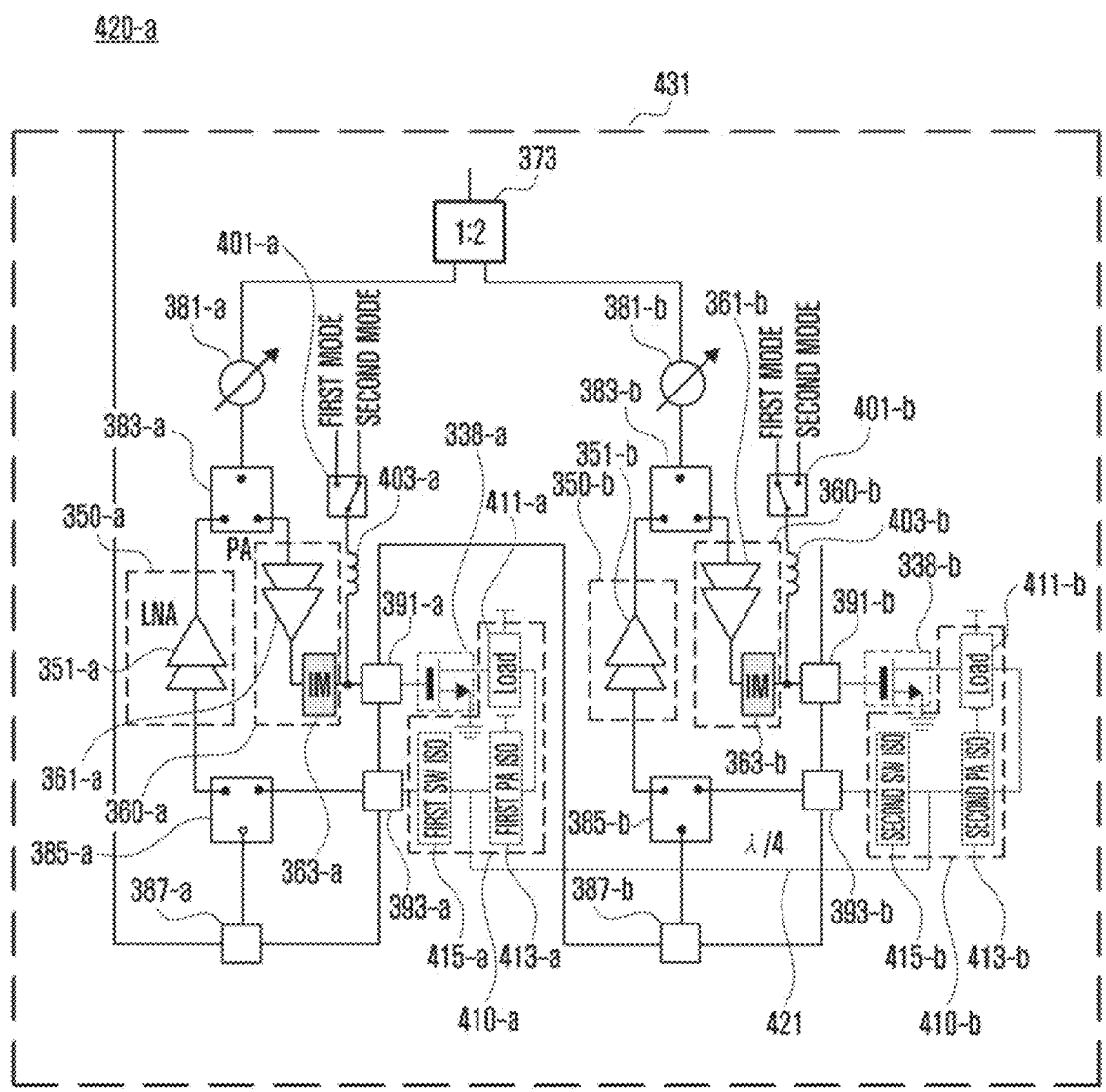
FIG. 4B is a diagram of a part of a communication circuit of an electronic device according to various embodiments of the disclosure.

According to various embodiments of the disclosure, the communication circuit 400 may be configured to perform amplification of a signal, the signal being transmitted by the frequency conversion circuit 340 and then split by the splitters 442, 371, 372, 373, 374, 375, 376, by using first transmission chains (e.g., first transmission chains 360-*a*, 360-*c*, 360-*e*, and 360-*g* of FIG. 4B), first amplifiers (e.g., first amplifiers 338-*a*, 338-*c*, 338-*e*, and 338-*g* of FIG. 4B), second transmission chains (e.g., second transmission chains 360-*b*, 360-*d*, 360-*f*, and 360-*h* of FIG. 4B), and/or second amplifiers (e.g., second amplifiers 338-*b*, 338-*d*, 338-*f*, and 338-*h* of FIG. 4B).

According to various embodiments of the disclosure, the communication circuit 400 may include a voltage control circuit 441 configured to control a bias voltage applied to the first amplifiers 338-*a*, 338-*c*, 338-*e*, and 338-*g* and/or the second amplifiers 338-*b*, 338-*d*, 338-*f*, and 338-*h*. For example, the voltage control circuit 441 may be configured to control a bias voltage applied to the first amplifier 338-*a* and/or the second amplifier 338-*b*, based on a control signal transmitted by the communication processor 214.

According to various embodiments of the disclosure, the voltage control circuit 441 may be configured to control a bias voltage applied to the first amplifiers 338-*a*, 338-*c*, 338-*e*, and 338-*g* in a method of controlling a first mode selection circuit (e.g., first mode selection circuits 401-*a*, 401-*c*, 401-*e*, and 401-*g* of FIG. 4A) electrically connected to the first amplifiers 338-*a*, 338-*c*, 338-*e*, and 338-*g*. The first mode selection circuits 401-*a*, 401-*c*, 401-*e*, and 401-*g* may connect the first amplifiers 338-*a*, 338-*c*, 338-*e*, and 338-*g* to one circuit among circuits for applying a first bias voltage corresponding to a first mode or for applying a second bias voltage corresponding to a second mode based on the control of the voltage control circuit 441. The first mode selection circuits 401-*a*, 401-*c*, 401-*e*, and 401-*g* may include an inductor (e.g., inductors 403-*a*, 403-*c*, 403-*e*, and 403-*g* in FIG. 4A) in order to reduce (or prevent) leakage of a signal to the first mode selection circuits 401-*a*, 401-*c*, 401-*e*, and 401-*g*, the signal being output from the amplifiers 360-*a*, 360-*c*, 360-*e*, and 360-*g*.

According to various embodiments of the disclosure, the voltage control circuit 441 may be configured to control a bias voltage applied to the second amplifiers 338-*b*, 338-*d*, 338-*f*, and 338-*h* in a method of controlling a second mode selection circuit (e.g., second mode selection circuits 401-*b*, 401-*d*, 401-*f*, and 401-*h* of FIG. 4A) electrically connected to the second amplifiers 338-*b*, 338-*d*, 338-*f*, and 338-*h*. The second mode selection circuits 401-*b*, 401-*d*, 401-*f*, and 401-*h* may connect the second amplifiers 338-*b*, 338-*d*, 338-*f*, and 338-*h* to one circuit among circuits for applying a first bias voltage corresponding to a first mode or for applying a second bias voltage corresponding to a second mode based on the control of the voltage control circuit 441. The second mode selection circuits 401-*b*, 401-*d*, 401-*f*, and 401-*h* may include an inductor (e.g., inductors 403-*b*, 403-*d*, 403-*f*, and 403-*h* in FIG. 4B) in order to reduce (or prevent) leakage of a signal to the second mode selection circuits 401-*b*, 401-*d*, 401-*f*, and 401-*h*, the signal being output from the amplifiers 360-*b*, 360-*d*, 360-*f*, and 360-*h*.

According to various embodiments of the disclosure, the first amplifiers 338-*a*, 338-*c*, 338-*e*, and 338-*g* and second amplifiers 338-*b*, 338-*d*, 338-*f*, and 338-*h* may be electrically connected. The output terminal of the first amplifiers 338-*a*, 338-*c*, 338-*e*, and 338-*g* and the output terminal of the second amplifiers 338-*b*, 338-*d*, 338-*f*, and 338-*h* may be electrically connected through transmission lines 421-*a*, 421-*b*, 421-*c*, and 421-*d* having a specific length. For example, the output terminal of the first amplifier 338-*a* and the output terminal of the second amplifier 338-*b* may be electrically connected through the transmission line 421-*a* having a specific length. The output terminal of the first amplifier 338-*c* and the output terminal of the second amplifier 338-*d* may be electrically connected through the transmission line 421-*b* having a specific length. The output terminal of the first amplifier 338-*e* and the output terminal of the second amplifier 338-*f* may be electrically connected through the transmission line 421-*c* having a specific length. The output terminal of the first amplifier 338-*g* and the output terminal of the second amplifier 338-*h* may be electrically connected through a transmission line 421-*d* having a specific length. The signal amplified by the second amplifiers 338-*b*, 338-*d*, 338-*f*, and 338-*h* may be transmitted to the first antennas 311, 312, 313, and 314 through the transmission lines 421-*a*, 421-*b*, 421-*c*, and 421-*d* and the third switch (e.g., the third switches 385-*a*, 385-*c*, 385-*e*, and 385-*g* of FIG. 3D). In one embodiment, the transmission lines 421-*a*, 421-*b*, 421-*c*, and 421-*d* may have a length of about 0.25 times (¼λ) the wavelength of the amplified signal in order to reduce the decrease in amplification efficiency caused by reduction of the impedance, which is viewed by the second amplifiers 338-*b*, 338-*d*, 338-*f*, and 338-*h* (the output impedance of the second amplifiers 338-*b*, 338-*d*, 338-*f*, and 338-*h*) when the communication circuit 400 operates in a first operation mode, at half of the impedance viewed by the second amplifiers 338-*b*, 338-*d*, 338-*f*, and 338-*h* (the output impedance of the second amplifiers 338-*b*, 338-*d*, 338-*f*, and 338-*h*) when the communication circuit 400 operates in a second operation mode.

The signal amplified by the first amplifiers 338-*a*, 338-*c*, 338-*e*, and 338-*g* may be transmitted to the first antennas 311, 312, 313, and 314 through the third switch 385-*a*, 385-*c*, 385-*e*, and 385-*g*. The first antennas 311, 312, 313, and 314 may radiate the signal, which is amplified by the first amplifiers 338-*a*, 338-*c*, 338-*e*, and 338-*g* and/or the second amplifiers 338-*b*, 338-*d*, 338-*f*, and 338-*h*, thereby realizing radiation of a relatively large signal.

In one embodiment, the communication circuit 300 illustrated in FIG. 3D and the communication circuit 400 illustrated in FIG. 4A may be different from each other with regard to the connection of the first antennas 311, 312, 313, and 314. The communication circuit 400 of FIG. 4A may be connected to the first antennas 311, 312, 313, and 314 through the third switches 385-*a*, 385-*c*, 385-*e*, and 385-*g*, and may be connected to the second antennas 321, 322, 323, and 324 through the fourth switch (e.g., the fourth switches 385-*b*, 385-*d*, 385-*f* and 385-*h* of FIG. 4B). In one embodiment, the communication circuit 300 of FIG. 3D may be connected to the first antennas 311, 312, 313, and 314 through switches 385-*a*, 385-*b*, 385-*c*, and 385-*d* electrically connected to the splitter 371, which is connected to a frequency conversion circuit (e.g., the frequency conversion circuit 400 of FIG. 3D), and may be connected to the second antennas 321, 322, 323, and 324 through the switches 385-*e*, 385-*f*, 385-*g*, and 385-*h* electrically connected to the splitter 372. There is a difference in that the communication circuit 400 is configured to implement the first operation mode or the second operation mode using the first amplifier 338-*a*, 338-*c*, 338-*e*, and 338-*g* connected to the first transmission chains 360-*a*, 360-*c*, 360-*e*, and 360-*g* and the second amplifiers 338-*b*, 338-*d*, 338-*f*, and 338-*h* connected to the second transmission chains 360-*b*, 360-*d*, 360-*f*, and 360-*g*. For example, while the antenna array including the first antennas 311, 312, 313, and 314 operates, the antenna array including the second antennas 321, 322, 323, and 324 may be configured not to operate. For example, when the antenna array including the first antennas 311, 312, 313, and 314 is operating, and while the first amplifiers 338-*a*, 338-*c*, 338-*e*, and 338-*g* connected to the first antennas 311, 312, 313, and 314 are operating, the second amplifiers 338-*b*, 338-*d*, 338-*f*, and 338-*h* connected to the second antennas 321, 322, 323, and 324 may be configured not to operate. According to an embodiment of the disclosure, when the antenna array including the first antennas 311, 312, 313, and 314 operates, the communication circuit 300 may be configured to amplify a signal by using the inactive second amplifiers 338-*b*, 338-*d*, 338-*f*, and 338-*h*, and may transmit the amplified signal by using the first antennas 311, 312, 313, and 314.

According to various embodiments of the disclosure, a configuration except for the first output impedance matching circuit (e.g., the first output impedance matching circuits 410-*a*, 410-*c*, 410-*e*, and 410-*g* of FIG. 4A), the second output impedance matching circuit (e.g., the second output impedance matching circuits 410-*b*, 410-*d*, 410-*f*, and 410-*h* of FIG. 4A), the first amplifiers 338-*a*, 338-*c*, 338-*e*, and 338-*g*, and/or the second amplifiers 338-*b*, 338-*d*, 338-*f*, and 338-*h*, among the configurations of the communication circuit 400 may be included in one integrated circuit 431.

Hereinafter, the operation of the communication circuit 400 shown in FIG. 4A will be described.

FIG. 4B is a diagram of a part of a communication circuit of an electronic device according to various embodiments of the disclosure.

A part 420 of the communication circuit 400 illustrated in FIG. 4B may be implemented by changing a part of the communication circuit 300 illustrated in FIG. 3D. According to an embodiment, the communication circuit 400 may include a wireless communication integrated circuit 431, a first amplifier 338-*a*, a second amplifier 338-*b*, or a transmission line 421.

According to various embodiments of the disclosure, the wireless communication integrated circuit 431 may include a splitter/combiner 373 configured to combine a signal received through the first reception chain 350-*a* and a signal received through the second reception chain 350-*b*, or separate a signal to be transmitted through the first transmission chain 360-*a* and a signal transmitted through the second transmission chain 360-*b*.

According to various embodiments of the disclosure, the wireless communication integrated circuit 431 may include a first phase shifter 381-*a* capable of changing the phase of a signal received through the first reception chain 350-*a* and/or a signal to be transmitted through the first transmission chain 360-*a*. The communication processor (e.g., the second communication processor 214 of FIG. 2) may be configured to control the first phase shifter 381-*a* to adjust the direction of a signal to be output.

According to various embodiments of the disclosure, the communication circuit 400 may include a second phase shifter 381-*b* capable of change the phase of a signal received through the second reception chain 350-*b* and/or a signal to be transmitted through the second transmission chain 360-*b*. The communication processor 214 may be configured to control the second phase shifter 381-*b* to adjust the direction of a signal to be output.

According to various embodiments of the disclosure, the wireless communication integrated circuit 431 may include the first switch 383-*a* configured to connect one chain among the first reception chain 350-*a* and the first transmission chain 360-*a* to the first phase shifter 381-*a*, and/or the second switch 383-*b* configured to connect one chain among the second reception chain 350-*b* and the second transmission chain 360-*b* to the second phase shifter 381-*b*.

According to various embodiments of the disclosure, the wireless communication integrated circuit 431 may include a first reception chain 350-*a* configured to receive a signal from a first antenna (e.g., the first antenna 311 of FIG. 4A) connected through the first antenna port 387-*a*. The first reception chain 350-*a* may include a low noise amplifier (LNA) 351-*a* for amplifying the received signal.

According to various embodiments of the disclosure, the wireless communication integrated circuit 431 may include a second reception chain 350-*b* configured to receive a signal from a second antenna (e.g., the second antenna 321 of FIG. 4A) connected through the second antenna port 387-*b*. The second reception chain 350-*b* may include an LNA 351-*b* for amplifying the received signal. In addition to the low-noise amplifiers 351-*a* and 351-*b*, the first reception chain 350-*a* and the second reception chain 350-*b* may include various components configured to perform an operation of converting the phase of the amplified signal or converting the frequency of the amplified signal.

According to various embodiments of the disclosure, the wireless communication integrated circuit 431 may include the first transmission chain 360-*a* configured to radiate a signal by using a first antenna 311 connected through a first antenna port 387-*a*. The first transmission chain 360-*a* may include an amplifier 361-*a* for amplifying a signal received from a frequency conversion circuit (e.g., the frequency conversion circuit 340 of FIG. 4A).

According to various embodiments of the disclosure, the wireless communication integrated circuit 431 may include the second transmission chain 360-*b* configured to radiate a signal by using a second antenna 321 connected through a second antenna port 387-*b*. The second transmission chain 360-*b* may include an amplifier 361-*a* for amplifying a signal received from a frequency conversion circuit (e.g., the frequency conversion circuit 340 of FIG. 3D).

According to various embodiments of the disclosure, the communication circuit 400 may include a third switch 385-*a* configured to connect one chain among the first reception chain 350-*a* and the first transmission chain 360-*a* to the first antenna port 387-*a* connected to the first antenna (e.g., the first antenna 311 in FIG. 3A). In a situation where signal output is performed using the first antenna 311, the communication processor 214 may be configured to control the third switch 385-*a* so as to connect the first transmission chain 360-*a* and the first antenna 311. In a situation where signal reception using the first antenna 311 is performed, the communication processor 214 may be configured to control the third switch 385-*a* so as to connect the first reception chain 350-*a* and the first antenna 311.

According to various embodiments of the disclosure, the wireless communication integrated circuit 431 the communication circuit 400 may include a fourth switch 385-*b* configured to connect one chain among the second reception chain 350-*b* and the second transmission chain 360-*b* to the port 387-*b* connected to the second antenna (e.g., the second antenna 321 in FIG. 3A). In a situation where signal output is performed using the second antenna 321, the communication processor 214 may be configured to control the fourth switch 385-*b* so as to connect the second transmission chain 360-*b* and the second antenna 321. In a situation where signal reception using the second antenna 321 is performed, the communication processor 214 may be configured to control the fourth switch 385-*a* so as to connect the second reception chain 350-*b* and the second antenna 321.

According to various embodiments of the disclosure, the first transmission chain 360-*a* may include a first amplifier 338-*a* for re-amplifying the signal amplified by the amplifier 361-*a*. The first transmission chain 360-*a* is located between the amplifier 361-*a* and the first amplifier 338-*a*, and may include the first input impedance matching circuit 363-*a* configured to perform input impedance matching for the first amplifier 338-*a*. An input terminal of the first amplifier 338-*a* may be connected to the first input impedance matching circuit 363-*a* through a first terminal 391-*a*. For example, when the first amplifier 338-*a* is implemented as a metal-oxide-semiconductor field-effect transistor (MOSFET), a gate terminal may be an input terminal of the first amplifier 338-*a*, and when the first amplifier 338-*a* is implemented as a bipolar junction transistor (BJT), a base terminal may be an input terminal of the first amplifier 338-*a*. The first transmission chain 360-*a* is connected between the first amplifier 338-*a* and the first switch 383-*a*, and may include an output impedance matching circuit 410-*a* configured to perform output impedance matching for the first amplifier 338-*a*. The first output impedance matching circuit 410-*a* may include a first load 411-*a* for amplification of the first amplifier 338-*a*, a first amplifier isolation circuit (PA ISO) 413-*a* configured to adjust (or increase) the output impedance of the first amplifier 338-*a*, and/or a first switch isolation circuit (SW ISO) 415-*a* configured to adjust (or increase) the output impedance of the first switch 383-*a*.

According to various embodiments of the disclosure, the output terminal of the first amplifier 338-*a* may be connected to the third switch 385-*a* through the second terminal 393-*a*. For example, when the first amplifier 338-*a* is implemented as a MOSFET, the drain terminal may be an output terminal of the first amplifier 338-*a*, and when the first amplifier 338-*a* is implemented as a BJT, a collector terminal may be an output terminal of the first amplifier 338-*a*.

According to various embodiments of the disclosure, the second transmission chain 360-*b* may include a second amplifier 338-*b* for re-amplifying the signal amplified by the amplifier 361-*b*. The second transmission chain 360-*b* is located between the amplifier 361-*b* and the second amplifier 338-*b*, and may include a second input impedance matching circuit 363-*b* configured to perform input impedance matching for the second amplifier 338-*b*.

The input terminal of the second amplifier 338-*b* may be connected to the fourth switch 385-*b* through the third terminal 391-*b*. For example, when the second amplifier 338-*b* is implemented as a MOSFET, the gate terminal may be an input terminal of the second amplifier 338-*b*, and when the second amplifier 338-*b* is implemented as a BJT, the base terminal may be the input terminal of the second amplifier 338-*b*.

According to various embodiments of the disclosure, the second transmission chain 360-*b* is connected between the second amplifier 338-*b* and the fourth switch 385-*b*, and may include a second output impedance matching circuit 410-*b* configured to perform output impedance matching for the second amplifier 338-*b*. The second output impedance matching circuit 410-*b* may include a second load 411-*b* for amplification of the second amplifier 338-*b*, a second amplifier isolation circuit 413-*b* configured to adjust (or increase) the output impedance of the second amplifier 338-*b*, and/or a first switch isolation circuit 415-*b* configured to adjust (or increase) the output impedance of the second switch 383-*b*.

An output terminal of the second amplifier 338-*b* may be connected to the second output impedance matching circuit 410-*b* through a fourth terminal 393-*b*. For example, when the second amplifier 338-*b* is implemented as a MOSFET, the drain terminal may be an output terminal of the second amplifier 338-*b*, and when the second amplifier 338-*b* is implemented as a BJT, the collector terminal may be an output terminal of the second amplifier 338-*b*.

According to various embodiments of the disclosure, the first load 411-*a* and/or the second load 411-*b* may include a passive element and/or an active element including a resistor having a value to achieve a configured amplification gain. When the first load 411-*a* and/or the second load 411-*b* includes an active element, and in a situation where the configured amplification gain is changed, the element value may be changed to implement the changed amplification gain.

According to various embodiments of the disclosure, the communication circuit 400 may perform signal amplification using the first amplifier 338-*a* and/or the second amplifier 338-*b* connected to the second transmission chain 360-*b*, in order to increase the output efficiency of the signal output through the first antenna (e.g., the first antenna 311 in FIG. 3A) in the first transmission chain 360-*a*.

According to various embodiments of the disclosure, the first amplifier 338-*a* may perform signal amplification using at least two modes configured differently according to the bias voltage (or bias current) applied to the first amplifier 338-*a*. The first amplifier 338-*a* may be configured to operate in one of various modes including a first mode and a second mode having higher power efficiency than that of the first mode, based on the bias voltage applied to the first amplifier 338-*a*. For example, the first amplifier 338-*a* operating in the first mode may be a class AB amplifier, and the second amplifier 338-*b* operating in the second mode is a class C amplifier.

According to various embodiments of the disclosure, the second amplifier 338-*b* may perform signal amplification using at least two modes configured differently according to a bias voltage (or bias current) applied to the second amplifier 338-*b*. The second amplifier 338-*b* may be configured to operate in one of various modes including a first mode and a second mode having higher power efficiency than that of the first mode, based on the bias voltage applied to the second amplifier 338-*b*. For example, the second amplifier 338-*b* operating in the first mode may be a class AB amplifier, and the second amplifier 338-*b* operating in the second mode is a class C amplifier.

According to various embodiments of the disclosure, the communication circuit 400 may include a voltage control circuit (e.g., the voltage control circuit 441 of FIG. 4A) configured to control a bias voltage applied to the first amplifier 338-*a* and/or the second amplifier 338-*b*. The voltage control circuit 441 may be configured to control a bias voltage applied to the first amplifier 338-*a* and/or the second amplifier 338-*b*, based on a control signal transmitted by the communication processor 214.

According to various embodiments of the disclosure, the voltage control circuit 441 may be configured to control a bias voltage applied to the first amplifier 338-*a* in a method of controlling the first mode selection circuit 401-*a* electrically connected to the first amplifiers 338-*a*. The first mode selection circuit 401-*a* may electrically connect the first amplifier 338-*a* to one circuit among circuits for applying a first bias voltage corresponding to a first mode or for applying a second bias voltage corresponding to a second mode based on the control of the voltage control circuit 441. The first mode selection circuit 401-*a* may include the inductor 403-*a* in order to reduce (or prevent) leakage of a signal to the first mode selection circuit 401-*a*, the signal being output from the amplifier 360-*a*.

According to various embodiments of the disclosure, the voltage control circuit 441 may be configured to control a bias voltage applied to the second amplifier 338-*b* in a method of controlling the second mode selection circuit 401-*b* electrically connected to the second amplifier 338-*b*. The second mode selection circuits 401-*b* may electrically connect the second amplifier 338-*b* to one circuit among circuits for applying a first bias voltage corresponding to a first mode or for applying a second bias voltage corresponding to a second mode based on the control of the voltage control circuit 441. The second mode selection circuit 401-*b* may include the inductor 403-*b* in order to reduce (or prevent) leakage of a signal to the second mode selection circuit 401-*b*, the signal being output from the amplifier 360-*b*.

According to various embodiments of the disclosure, the first amplifier 338-*a* and the second amplifier 338-*b* may be electrically connected. In an embodiment, the output terminal of the first amplifier 338-*a* and the output terminal of the second amplifier 338-*b* may be electrically connected through a transmission line 421 having a specific length. The signal amplified by the second amplifier 338-*b* may be transmitted to the first antenna 311 through the transmission line 421 and the third switch 385-*a*.

The signal amplified by the first amplifier 338-*a* may be transmitted to the first antenna 311 through the third switch 385-*a*. The first antenna 311 may radiate the signal amplified by the first amplifier 338-*a* and/or the second amplifier 338-*b*, thereby realizing radiation of a relatively strong strength signal.

Although the above description has been established under an assumption that the signal is radiated through the first antenna 311, radiating the signal through the second antenna 321 instead of the first antenna 311 may also be implemented. For example, the signal amplified by the first amplifier 338-*a* may be transmitted to the second antenna 321 through the transmission line 421 and the fourth switch 385-*b*. The signal amplified by the second amplifier 338*b* may be transmitted to the second antenna 321 through the fourth switch 385-*b*. The second antenna 321 may radiate the signal amplified by the first amplifier 338-*a* and/or the second amplifier 338-*b*, thereby realizing radiation of a relatively strong strength signal.

According to various embodiments of the disclosure, the communication circuit 400 may operate in one mode among the first operation mode and the second operation mode according to the strength of the input signal. The first operation mode may refer to a mode in which a signal having a strength equal to or greater than (or exceeding) a predetermined value is input to the first amplifier 338-*a* and/or the second amplifier 338-*b*. The first operation mode may be in a state in which the second amplifier 338-*b* amplifies an input signal, and may be a state in which the first amplifier 338-*a* amplifies an input signal. The second operation mode may refer to a mode in which a signal having a strength equal to or less than (or below) a predetermined value is input to the first amplifier 338-*a* and/or the second amplifier 338-*b*. The second operation mode may be in a state in which the second amplifier 338-*b* amplifies the input signal and the first amplifier 338-*a* is configured not to amplify the input signal. The first operation mode may be a mode in which a signal having a relatively strong output is radiated compared to the second operation mode. The transmission line 421 may have a length of about 0.25 times (¼ λ) the wavelength of the amplified signal in order to reduce the decrease in amplification efficiency caused by reduction of the impedance, viewed by the second amplifier 338-*b* (e.g., the output impedance of the second amplifier 338-*b*) when the communication circuit 400 operates in a first operation mode, at half of the impedance viewed by the second amplifier 338-*b* (e.g., the output impedance of the second amplifier 338-*b*) when the communication circuit 400 operates in a second operation mode.

Figure 5A:
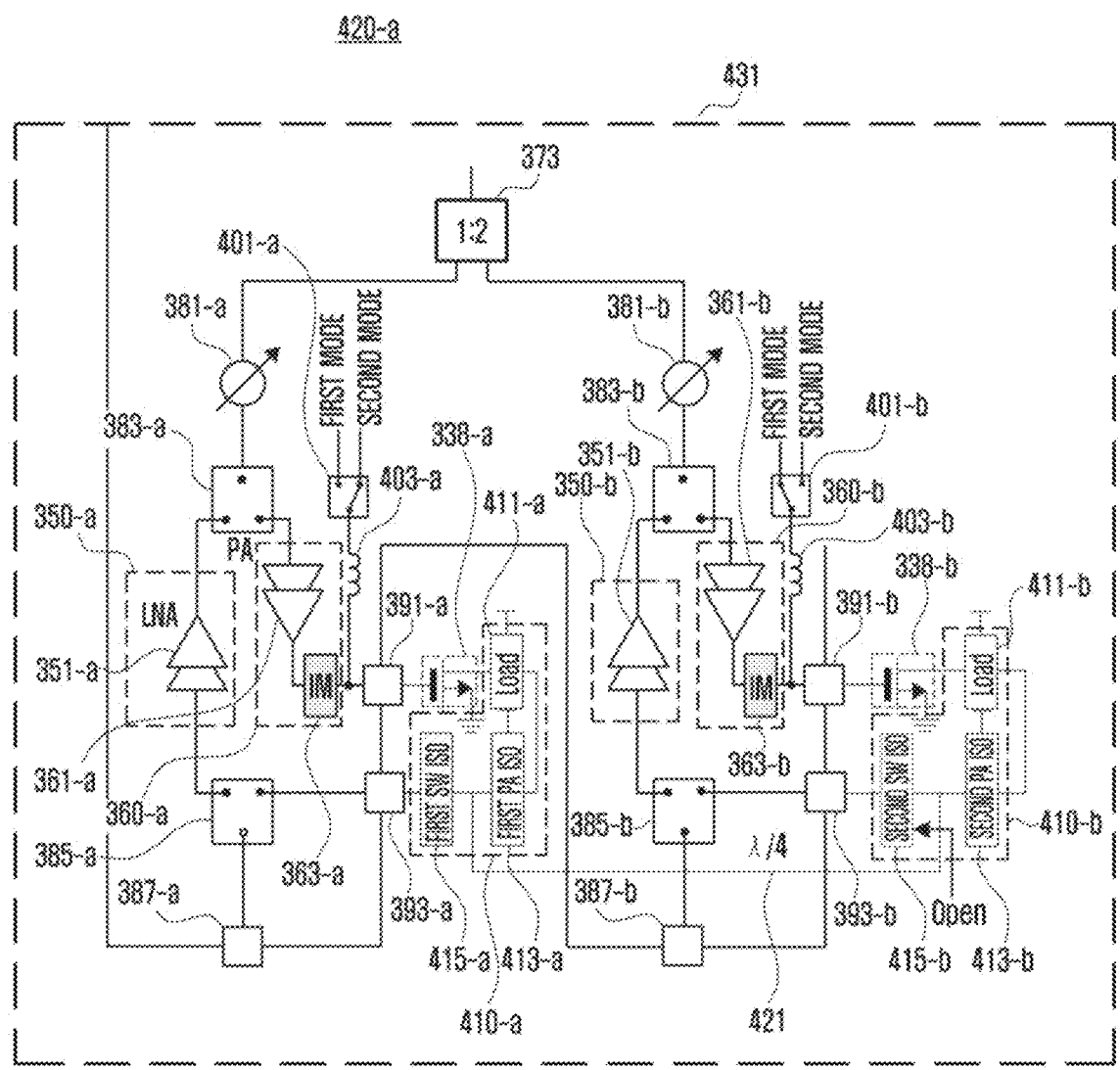
FIG. 5A is a diagram of a communication circuit operating in a first operation mode in an electronic device according to various embodiments of the disclosure.

FIG. 5A is a diagram of a communication circuit operating in a first operation mode in an electronic device according to various embodiments of the disclosure.

According to various embodiments of the disclosure, the first operation mode may refer to an operation mode in which the first amplifier 338-*a* operates in a second mode and the second amplifier 338-*b* operates in the first mode. It may be assumed that a signal is output through the first antenna 311, and when the signal is output through the second antenna 321, the first operation mode may refer to an operation mode in which the first amplifier 338-*a* of the communication circuit 400 operates in a first mode and the second amplifier 338-*b* operates in a second mode.

FIG. 5A illustrates a state in which the communication circuit 400 operates in the first operation mode while outputting a signal through the first antenna 311.

According to various embodiments of the disclosure, the communication processor (e.g., the second communication processor 214 of FIG. 2) may be configured to control a third switch 385-*a* to connect the first amplifier 338-*a* and the first antenna port 387-*a* to which the first antenna 311 is connected. For example, the first reception chain 350-*a* may be disconnected from the first antenna 311 by the first switch 385-*a*. The communication processor 214 may be configured to control the fourth switch 385-*b* so that the second amplifier 338-*b* is not connected to the second antenna port 387-*b* to which the second antenna 321 is connected. For example, the second reception chain 350-*b* and the second antenna 321 may be in a connected state, or the second reception chain 350-*b* and the second transmission chain 360-*b* both may not be connected to the second antenna 321.

According to various embodiments of the disclosure, the voltage control circuit 441 may be configured to control a bias voltage applied to the first amplifier 338-*a* and/or the second amplifier 338-*b*. The voltage control circuit 441 may be configured to control the first mode selection circuit 401-*a* so that the first amplifier 338-*a* operates in a second mode (e.g., class C). For example, the voltage control circuit 441 may be configured to control the first mode selection circuit 401-*a* to connect the first amplifier 338-*a* with a circuit for applying a second bias voltage corresponding to the second mode. The voltage control circuit 441 may be configured to control the second mode selection circuit 401-*b* so that the second amplifier 338-*b* operates in a first mode (e.g., class AB). For example, the voltage control circuit 441 may be configured to control the second mode selection circuit 401-*b* to connect the second amplifier 338-*b* with a circuit for applying a first bias voltage corresponding to the first mode.

According to various embodiments of the disclosure, in the first operation mode, the first amplifier 338-*a* operating in the second mode will have a higher amplification gain than that of the second amplifier 338-*b* operating in the first mode.

According to various embodiments of the disclosure, the signal output from the frequency conversion circuit (e.g., the frequency conversion circuit 340 of FIG. 3D) may be transmitted to the first transmission chain 360-*a* and the second transmission chain 360-*b* through the splitter 373. The first transmission chain 360-*a* may be configured to amplify the received signal and transmit the amplified signal to the first amplifier 338-*a*. The first amplifier 338-*a* may be configured to amplify the amplified signal again while operating in the second mode. The signal amplified by the first amplifier 338-*a* may be output to the first antenna 311 through the first output impedance matching circuit 410-*a* and the first switch 385-*a*. The second transmission chain 360-*b* may be configured to amplify the received signal and transmit the amplified signal to the second amplifier 338-*b*. Before the signal is input to the second transmission chain 360-*b*, the phase may be changed by the phase converter 381-*b* to compensate for the phase change caused by the transmission line 421. The second amplifier 338-*b* may be configured to amplify the amplified signal again while operating in the first mode. The second switch isolation circuit 415-*b* may be in an open state. The signal amplified by the second amplifier 338-*b* may be output to the first antenna 311 through the second output impedance matching circuit 410-*b*, the transmission line 421, and the third switch 385-*a*. For example, the signal amplified by the first amplifier 338-*a* and the signal amplified by the second amplifier 338-*b* may be added and outputted to the first antenna 311.

According to various embodiments of the disclosure, the second output impedance matching circuit 410-*b* may include a second switch isolation circuit 415-*b* to prevent the signal amplified by the second amplifier 338-*b* from being transmitted to the fourth switch 385-*b*, in the first operation mode. The second switch isolation circuit 415-*b* may be a circuit configured to reduce (or prevent) transmission of the signal amplified by the second amplifier 338-*b* to the fourth switch 385-*b*, due to the parasitic impedance included in the fourth switch 385-*b*.

According to various embodiments of the disclosure, the second switch isolation circuit 415-*b* may be implemented in the form of a passive element including at least one of a resistor, an inductor, and a capacitor, or an active element having an impedance similar to that of the passive element (e.g., an active element implemented in the form of a pattern on the second surface 310-*b* of the second substrate 310). For example, a magnitude of the impedance of the second switch isolation circuit 415-*b* may correspond to a magnitude by which the fourth switch 385-*b* is implemented to be in an open state through impedance matching of the fourth switch 385-*b* with the parasitic impedance.

According to various embodiments of the disclosure, the fourth switch 385-*b* is in a short state (e.g., a state in which the fourth switch 385-*b* is configured to connect the second antenna 321 and the second amplifier 338-*b*), the impedance (e.g., 50Ω) of the fourth switch 385-*b* may not significantly change by the second switch isolation circuit 415-*b*.

According to various embodiments of the disclosure, the second switch isolation circuit 415-*b* may be configured to reduce (or prevent) the transmission of the amplified signal to the fourth switch 385-*b* in a state in which the fourth switch 385-*b* having a parasitic impedance is open (e.g., a state in which the fourth switch 385-*b* is not connected to the amplifier 338-*b*).

The first switch isolation circuit 415-*a* may be implemented substantially the same as the second switch isolation circuit 415-*b*, and when radiating a signal through the second antenna 321, the first switch isolation circuit 415-*a* may perform substantially the same role as that of the second switch isolation circuit 415-*b*.

Figure 5B:
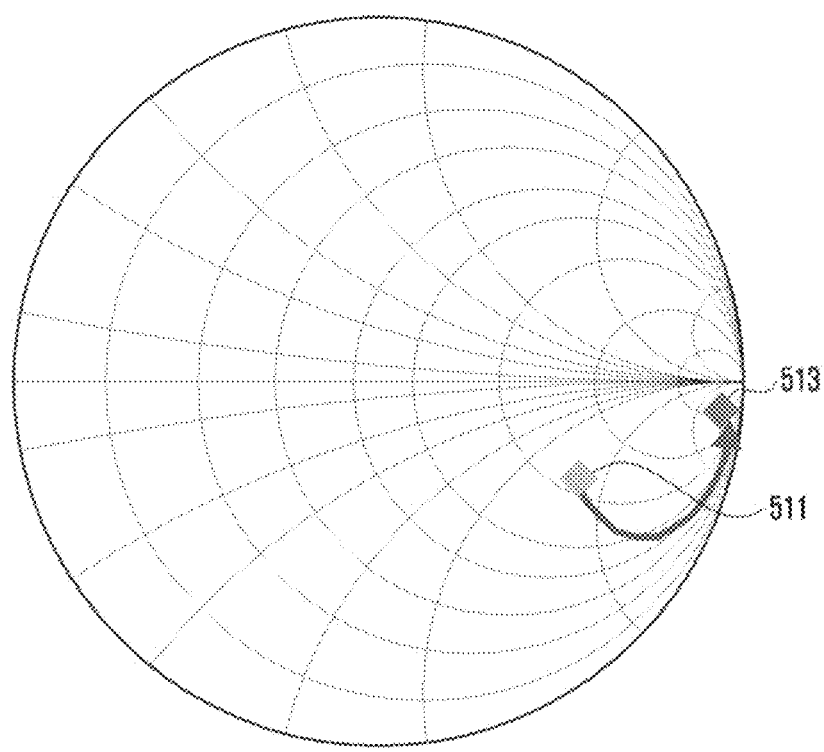
FIG. 5B is a diagram of an impedance change of a second switch due to a second switch isolation circuit included in a second impedance matching circuit in a communication circuit of an electronic device according to various embodiments of the disclosure.

FIG. 5B is a diagram of an impedance change of a fourth switch due to a second switch isolation circuit included in a second impedance matching circuit in a communication circuit of an electronic device according to various embodiments of the disclosure.

Referring to FIG. 5B, the output impedance change of the fourth switch 385-*b* by the second switch isolation circuit (e.g., the second switch isolation circuit 415-*b* of FIG. 5A) is shown.

According to various embodiments of the disclosure, when the fourth switch 385-*b* is in an open state (e.g., a state in which the fourth switch 385-*b* is not connected to the second amplifier 338-*b*), the impedance of the fourth switch 385-*b* may be configured not to be ∞ due to a parasitic impedance component. In FIG. 5B, it may be identified that a position 511 on the Smith chart corresponding to the impedance of the fourth switch 385-*b* corresponds to a position having a specific impedance value rather than ∞.

According to various embodiments of the disclosure, the second switch isolation circuit 415-*b* may include a passive element including at least one of a resistor, an inductor, and a capacitor, or an active element having an impedance similar to that of the passive element (e.g., an active element implemented in the form of a pattern on the second surface 310-*b* of the second substrate 310). For example, a magnitude of the impedance of the second switch isolation circuit 415-*b* may correspond to a magnitude by which the fourth switch 385-*b* is implemented to be in an open state through impedance matching of the fourth switch 385-*b* with the parasitic impedance.

In FIG. 5B, it may be identified that a position 511 on the Smith chart corresponding to the impedance of the fourth switch 385-*b* is changed to a position 513 having a value close to ∞ due to the second switch isolation circuit 415-*b*.

Although FIG. 5B has been described with reference to the second switch isolation circuit 415-*b*, the first switch isolation circuit 415-*a* may also perform substantially the same function. For example, the first switch isolation circuit 415-*a* may perform substantially the same role as that of the second switch isolation circuit 415-*b* in a state where the signal is radiated through the second antenna 321.

Figure 5C:
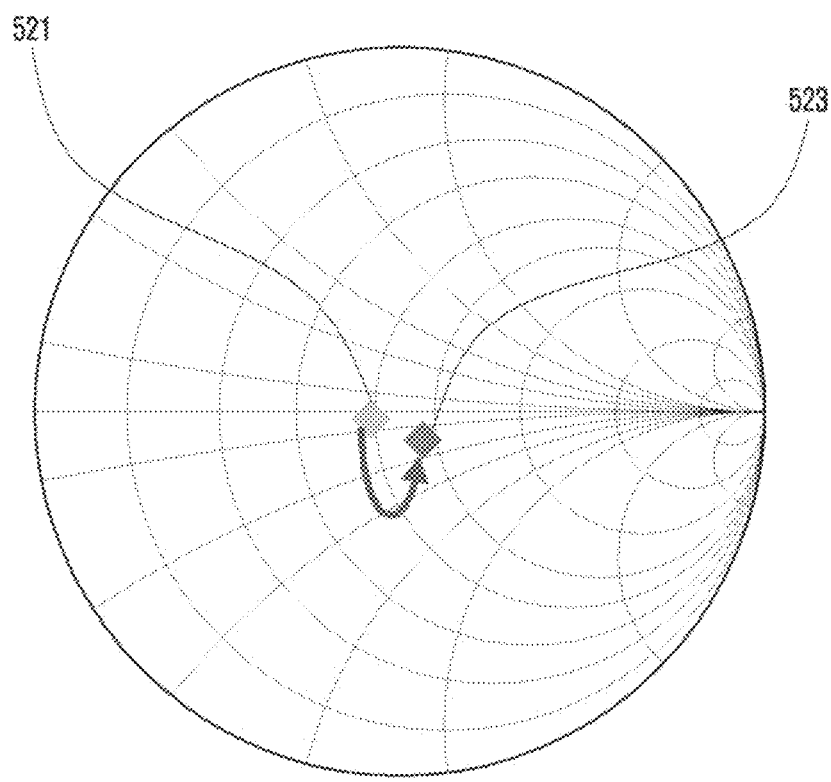
FIG. 5C is a diagram of an impedance change of a first switch due to a first switch isolation circuit included in a first impedance matching circuit in a communication circuit of an electronic device according to various embodiments of the disclosure.

FIG. 5C is a diagram of an impedance change of a third switch due to a first switch isolation circuit included in a first impedance matching circuit in a communication circuit of an electronic device according to various embodiments of the disclosure.

According to various embodiments of the disclosure, when the third switch 385-*a* is in a short state (e.g., a state in which the third switch 385-*a* connects the first antenna 311 and the first amplifier 338-*a*), the impedance (e.g., 50Ω) of the third switch 385-*a* may not significantly change by the first switch isolation circuit 415-*a*.

In FIG. 5C, although the position 521 on the Smith chart corresponding to the impedance of the third switch 385-*a* moves to the changed position 523 due to the second switch isolation circuit 415-*b*, the original position 521 and the changed position 523 do not have a significant difference.

Although FIG. 5C has been described with reference to the first switch isolation circuit 415-*a*, the second switch isolation circuit 415-*b* may also perform substantially the same function. For example, the second switch isolation circuit 415-*b* may perform substantially the same role as that of the first switch isolation circuit 415-*a* in a state of performing signal radiation through the second antenna 321.

Figure 6A:
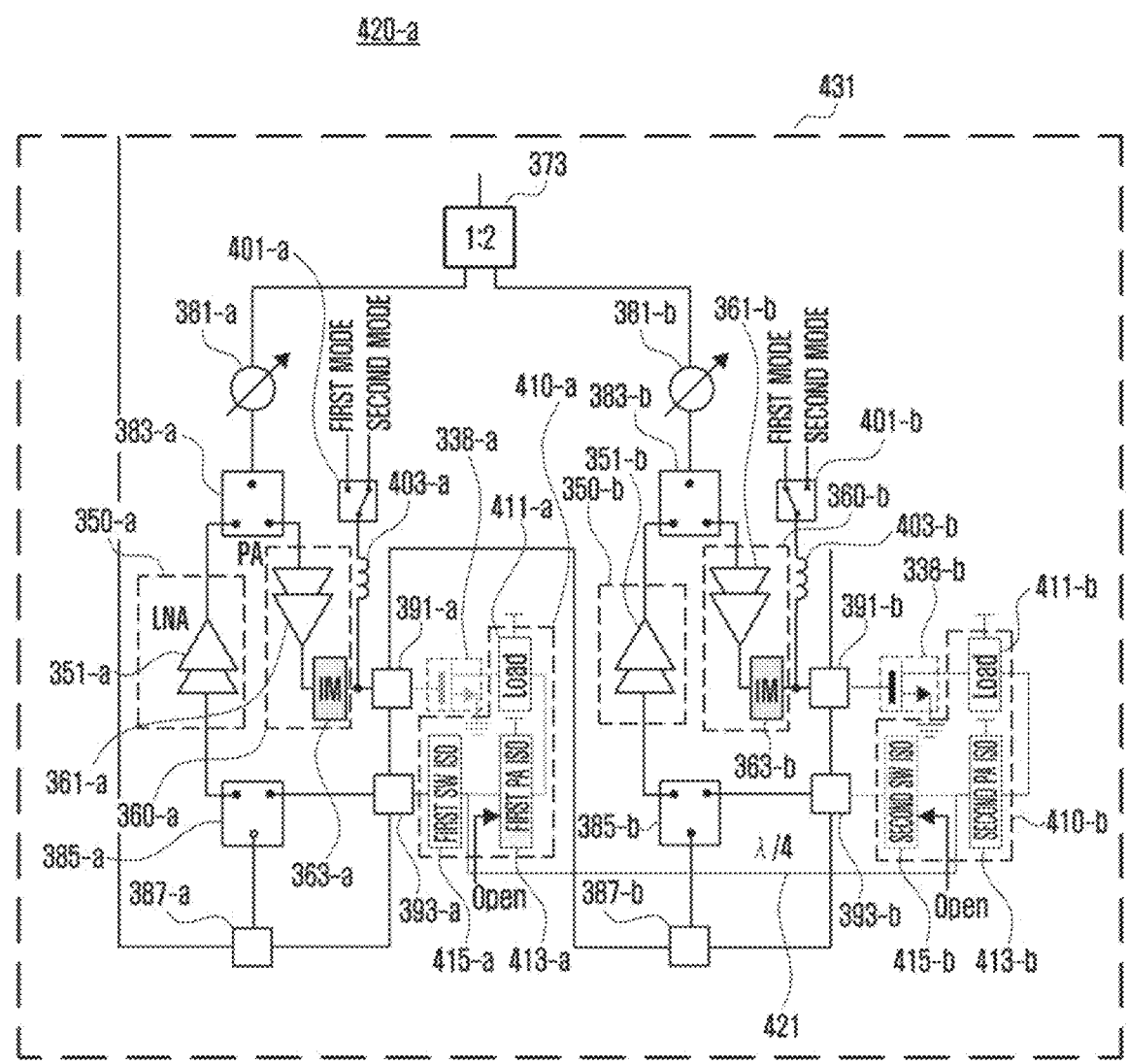
FIG. 6A is a diagram of a communication circuit operating in a second operation mode in an electronic device according to various embodiments of the disclosure.

FIG. 6A is a diagram of a communication circuit operating in a second operation mode in an electronic device according to various embodiments of the disclosure.

According to various embodiments of the disclosure, the communication processor (e.g., the second communication processor 214 of FIG. 2) may be configured to control a third switch 385-*a* to connect a first amplifier 338-*a* and a first antenna port 387-*a* to which the first antenna 311 is connected, in order to output a signal through the first antenna 311. For example, a first reception chain 350-*a* may be disconnected from the first antenna 311 by the third switch 385-*a*. The communication processor 214 may be configured to control a fourth switch 385-*b* so that the second amplifier 338-*b* is not connected to the second antenna port 387-*b* to which the second antenna 321 is connected. For example, the second reception chain 350-*b* and the second antenna 321 may be in a connected state, or the second reception chain 350-*b* and the second transmission chain 360-*b* both may not be connected to the second antenna 321.

According to various embodiments of the disclosure, the voltage control circuit 441 may be configured to control a bias voltage applied to the first amplifier 338-*a* and/or the second amplifier 338-*b*. The voltage control circuit 441 may be configured to control the first amplifier 338-*a* to operate in a second mode (e.g., class C). The voltage control circuit 441 may be configured to control a second mode selection circuit 401-*b* so that the second amplifier 338-*b* operates in a first mode (e.g., class AB). The voltage control circuit 441 may be configured to control the second mode selection circuit 401-*b* to connect the circuit for applying the first bias voltage corresponding to the first mode to the second amplifier 338-*b*.

According to various embodiments of the disclosure, the second operation mode may correspond to an operation mode in which the first amplifier 338-*a* is inactive and only the second amplifier 338-*b* is active, and a signal having a magnitude greater than or equal to a predetermined value is amplified.

According to various embodiments of the disclosure, the signal output from the frequency conversion circuit (e.g., the frequency conversion circuit 340 of FIG. 3D) may be transmitted to the first transmission chain 360-*a* and the second transmission chain 360-*b* through the splitter 373. The first transmission chain 360-*a* may be configured not to transmit the received signal to the first antenna 311 due to the inactive first amplifier 338-*a*. The second transmission chain 360-*b* may be configured to amplify the received signal and transmit the amplified signal to the second amplifier 338-*b*. The second amplifier 338-*b* may be configured to amplify the amplified signal again while operating in the first mode. The signal amplified by the second amplifier 338-*b* may be configured not to be transferred to a fourth switch 385-*b* due to the second switch isolation circuit 415-*b* in an open state. The signal amplified by the second amplifier 338-*b* may be output to the first antenna 311 through the second output impedance matching circuit 410-*b*, the transmission line 421, and the third switch 385-*a*. The first antenna 311 may be connected to the third switch 385-*a* through the first antenna port 387-*a*.

According to various embodiments of the disclosure, the second output impedance matching circuit 410-*b* may include a second switch isolation circuit 415-*b* to prevent the signal amplified by the second amplifier 338-*b* from being transmitted to the fourth switch 385-*b*, in the first operation mode. The second switch isolation circuit 415-*b* may be a circuit configured to reduce (or prevent) transmission of the signal amplified by the second amplifier 338-*b* to the fourth switch 385-*b* due to the parasitic impedance included in the fourth switch 385-*b*.

According to various embodiments of the disclosure, the second switch isolation circuit 415-*b* may be implemented in the form of a passive element including at least one of a resistor, an inductor, and a capacitor, or an active element having an impedance similar to that of the passive element (e.g., an active element implemented in the form of a pattern on the second surface 310-*b* of the second substrate 310). For example, a magnitude of the impedance of the second switch isolation circuit 415-*b* may correspond to a magnitude by which the fourth switch 385-*b* is implemented to be in an open state through impedance matching of the second switch 385-*b* with the parasitic impedance. As another example, the second switch isolation circuit 415-*b* may include a passive element including at least one of a resistor, an inductor, and a capacitor, or an active element.

According to various embodiments of the disclosure, in a state in which the fourth switch 385-*b* is in a short state (e.g., a state in which the fourth switch 385-*b* is configured to connect the second antenna 321 and the second amplifier 338-*b*), the impedance (e.g., 50Ω) of the fourth switch 385-*b* may not significantly change by the second switch isolation circuit 415-*b*.

According to various embodiments of the disclosure, the second switch isolation circuit 415-*b* may be configured to reduce (or prevent) the transmission of the amplified signal to the fourth switch 385-*b* in a state in which the fourth switch 385-*b* having a parasitic impedance is in an open state (e.g., a state in which the fourth switch 385-*b* is not connected to the amplifier 338-*b*).

The first output impedance matching circuit 410-*a* may include a first amplifier isolation circuit 413-*a* to prevent the signal amplified by the second amplifier 338-*b* from being transmitted to the first switch 338-*a*, in the second operation mode. The first switch isolation circuit 415-*b* may correspond to a circuit configured to reduce (or prevent) transmission of the signal amplified by the second amplifier 338-*b* to the first amplifier 338-*a* due to the parasitic impedance included in the first amplifier 338-*a*.

According to various embodiments of the disclosure, the first amplifier isolation circuit 413-*a* may be implemented in the form of a passive element including at least one of a resistor, an inductor, and a capacitor, or an active element having an impedance similar to that of the passive element (e.g., an active element implemented in the form of a pattern on the second surface 310-*b* of the second substrate 310). For example, a magnitude of the impedance of the first amplifier isolation circuit 413-*a* may correspond to a magnitude by which the first amplifier 338-*a* is implemented to be in an open state through impedance matching of the first amplifier 338-*a* with the parasitic impedance. As another example, the first amplifier isolation circuit 413-*a* may include a passive element including at least one of a resistor, an inductor, and a capacitor, or an active element.

According to various embodiments of the disclosure, the first amplifier isolation circuit 413-*a* may reduce (or prevent) the transmission of the signal amplified by the second amplifier 338-*b* to the first amplifier 338-*a*.

Figure 6B:
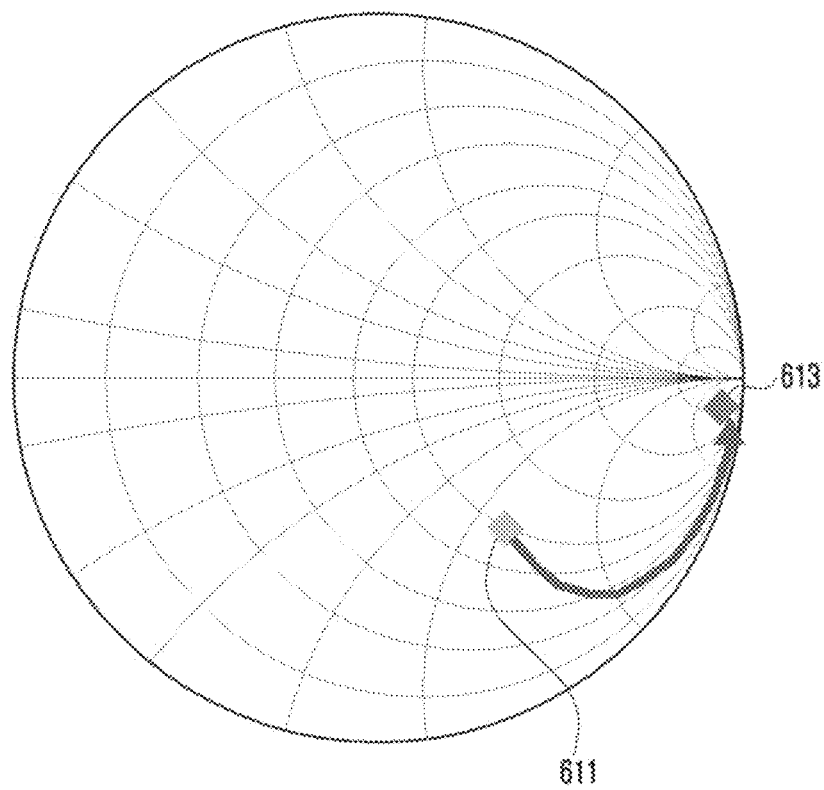
FIG. 6B is a diagram of an impedance change of a first amplifier due to a first amplifier isolation circuit included in a first impedance matching circuit in a communication circuit of an electronic device according to various embodiments of the disclosure.

FIG. 6B is a diagram of an impedance change of a first amplifier due to a first amplifier isolation circuit included in a first impedance matching circuit, in a communication circuit of an electronic device according to various embodiments of the disclosure.

FIG. 6B shows the impedance change of the first amplifier 338-*a* by the first amplifier isolation circuit 413-*a*.

According to various embodiments of the disclosure, when the first amplifier 338-*a* is in an inactive state (or in a state in which the output impedance of the first amplifier 338-*a* is ∞), the impedance of the first amplifier 338-*a* may be configured not to be ∞ due to the parasitic impedance component. In FIG. 6B, it may be identified that a position 611 on the Smith chart corresponding to the output impedance of the first amplifier 338-*a* corresponds to a position having a specific impedance value rather than ∞.

According to various embodiments of the disclosure, the magnitude of the impedance of the first amplifier isolation circuit 413-*a* may correspond to the magnitude by which the first amplifier 338-*a* is implemented to be in an open state through impedance matching of the first amplifier 338-*a* with the parasitic impedance.

In FIG. 6B, it may be identified that a position 611 on the Smith chart corresponding to the output impedance of the first amplifier 338-*a* is changed to a position 613 having a value close to ∞ due to the first amplifier isolation circuit 413-*a*.

Although FIG. 6B has been described with reference to the first amplifier isolation circuit 413-*a*, the second amplifier isolation circuit 413-*b* may also perform substantially the same function. For example, the second amplifier isolation circuit 413-*b* may perform substantially the same role as that of the first amplifier isolation circuit 413-*a* in a state where the signal is radiated through the second antenna 321.

Figure 7A:
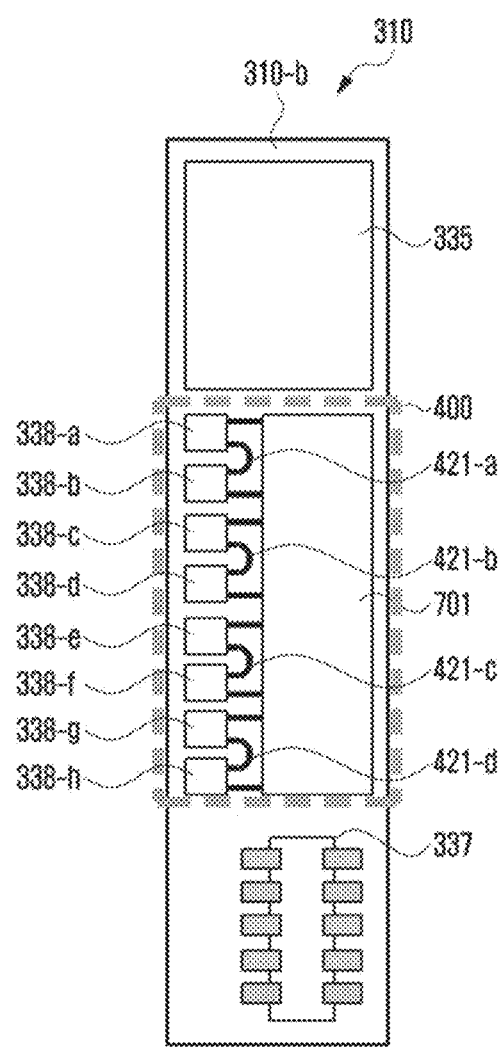
FIG. 7A is a diagram of a communication circuit of an electronic device according to various embodiments of the disclosure.

FIG. 7A is a diagram of a communication circuit of an electronic device according to various embodiments of the disclosure.

FIG. 7A illustrates a communication circuit 400 implemented on a second surface (e.g., the second surface 310-*b* of FIG. 3B) of a second substrate (e.g., the first substrate 310 of FIG. 3A). Referring to FIG. 7A, the communication circuit 400 may include a wireless communication integrated circuit 701. The communication circuit 400 may include a PMIC may be configured to control power supply (e.g., the PMIC 335 of FIG. 3B), an integrated circuit (e.g., the communication integrated circuit 431 of FIG. 4A) may be configured to perform an operation of increasing the frequency of a signal to be radiated through a first antenna (e.g., the first antennas 311, 312, 313, and 314 of FIG. 4A) and/or a second antenna (e.g., the second antennas 321, 322, 323, and 324 of FIG. 4A) or amplifying the signal to be radiated therethrough; a connector 337 connected to a communication processor (e.g., the first communication processor 212 of FIG. 2 or the second communication processor 214 of FIG. 2) and/or an application processor (e.g., the processor 120 of FIG. 1), and first amplifiers 338-*a*, 338-*c*, 338-*e*, and 338-*g*, and second amplifiers 338-*b*, 33*b*-*d*, 338-*f*, and 338-*h* configured to amplify a signal output from the integrated circuit 431 may be arranged on the second surface 310-*b* of the second substrate 310.

Figure 7B:
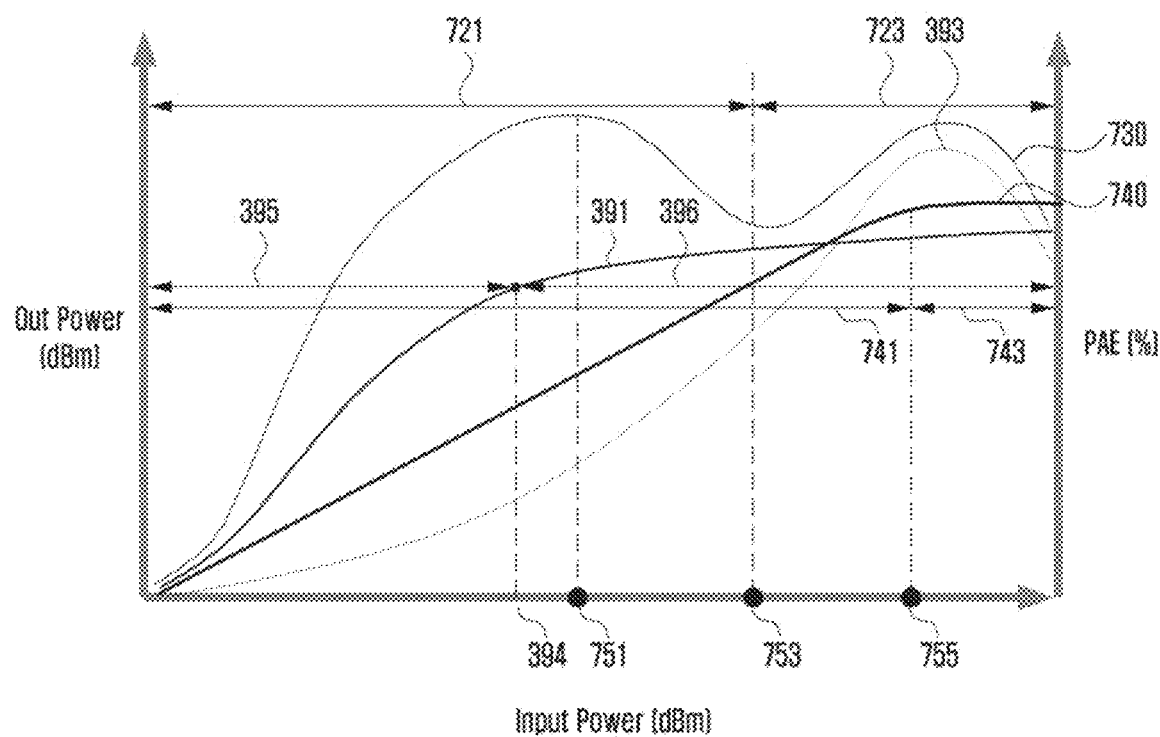
FIG. 7B is a graph illustrating an operating range and efficiency of an amplifier in a communication circuit of an electronic device according to various embodiments of the disclosure.

FIG. 7B is a graph illustrating an operating range and efficiency of an amplifier in a communication circuit of an electronic device according to various embodiments of the disclosure.

Reference numeral 730 illustrated in FIG. 7B is a curve illustrating amplification efficiency according to the magnitude of a signal input to a communication circuit (e.g., the communication circuit 400 of FIG. 4A).

According to various embodiments of the disclosure, the communication circuit 400 may operate in a second operation mode. The second operation mode may be an operation mode in which the first amplifier 338-*a* is inactive and only the second amplifier 338-*b* is active.

According to various embodiments of the disclosure, in a duration 721 in which the communication circuit 400 operates in the second operation mode, the amplification efficiency increases while the strength of the input signal increases, and the amplification efficiency decreases while the strength of the input signal exceeds a specific value 751.

The first operation mode may correspond to an operation mode in which the first amplifier 338-*a* of the communication circuit 400 operates in a second mode and the second amplifier 338-*b* operates in a first mode, and a more relatively large amplification than the second operation mode may be performed.

According to various embodiments of the disclosure, the first operation mode may refer to a mode in which a signal having a strength equal to or less than (or below) a predetermined value 753 is input to the first amplifier 338-*a* and/or the second amplifier 338-*b*. The first operation mode may be a state in which the second amplifier 338-*b* amplifies the input signal, and may be a state in which the first amplifier 338-*a* does not perform amplification of the input signal.

According to various embodiments of the disclosure, in a duration 723 in which the communication circuit 400 operates in the first operation mode, the efficiency of amplification may increase again while the strength of the input signal increases.

According to various embodiments of the disclosure, the second operation mode may refer to a mode in which a signal having a strength greater than (or exceeding) a specified value 753 is input to the first amplifier 338-*a* and/or the second amplifier 338-*b*. The second operation mode may be a state in which the second amplifier 338-*b* amplifies the input signal, and may be a state in which the first amplifier 338-*a* amplifies the input signal.

Reference numeral 740 shown in FIG. 7B indicates a curve showing the magnitude of the amplified signal according to the magnitude of the signal input to the communication circuit 400.

Referring to reference numeral 740, the communication circuit 400 may have a characteristic that, in a state in which the strength of the input signal is equal to or less than (or below) a specific value 755, the magnitude of the output signal also increases linearly as the magnitude of the input signal increases. The communication circuit 400 may have a characteristic that, in a state in which the strength of the input signal exceeds (or equal to or greater than) a specific value 755, the strength of the output signal saturates instead of being increased even if the magnitude of the input signal increases. The communication circuit 400 may be configured to be usable in a duration 741 in which the strength of the output signal increases linearly as the strength of the input signal increases, and may be configured not to be usable in a duration 743 in which the strength of the output signal saturates even if the magnitude of the input signal increases.

Comparing the usable duration 395 of the communication circuit 300 illustrated in FIG. 3E with the usable duration 741 of the communication circuit 400 illustrated in FIG. 7B, the usable duration 741 of the communication circuit 400 is identified to be wider than the usable duration 395 of the communication circuit 300. For example, the communication circuit 400 according to various embodiments of the disclosure may have a wider usable duration than the communication circuit 300.

Comparing the efficiency 393 of the communication circuit 300 shown in FIG. 3E with the amplification efficiency 740 of the communication circuit 400 shown in FIG. 7B (e.g., the communication circuit 400 of FIG. 4A), it may be identified that the amplification efficiency in the usable duration 741 of the communication circuit 400 is higher than the amplification efficiency 393 in the usable section 395 of the communication circuit 300. For example, the communication circuit 400 according to various embodiments of the disclosure may implement a higher amplification efficiency than that of the communication circuit 300.

Figure 8A:
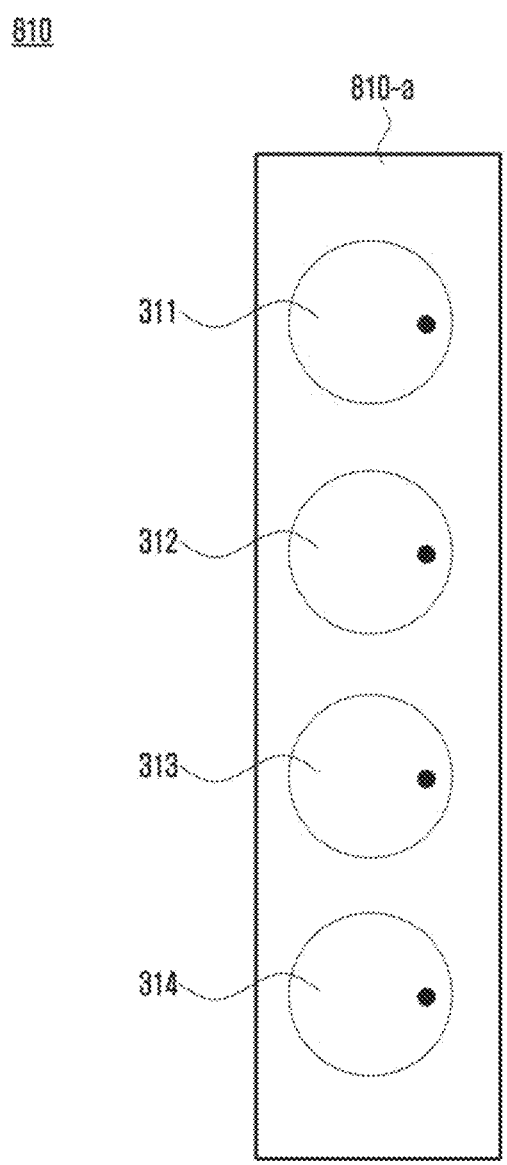
FIGS. 8A and 8B are diagrams of an antenna module of an electronic device according to various embodiments of the disclosure.
Figure 8B:
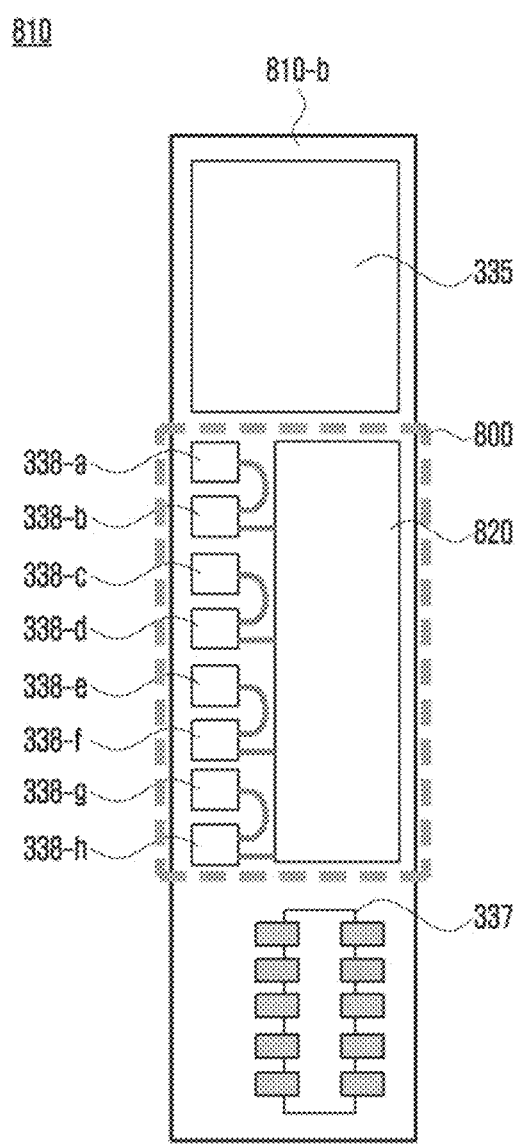

FIGS. 8A and 8B are diagrams of an antenna module of an electronic device according to various embodiments of the disclosure.

Referring to FIGS. 8A and 8B, the antenna module 246 may be implemented in a form including only the first substrate 310.

According to various embodiments of the disclosure, a first substrate 810 included in the antenna module 246 may include at least one first antenna (e.g., the antenna 248 of FIGS. 2) 311, 312, 313, and 314. The first antennas 311, 312, 313, and 314 may be disposed on a first surface 810-*a* of the first substrate 810 or inside the substrate 810 closer to the first surface 810-*a* than a second surface 810-*b*. For example, the first antennas 311, 312, 313, and 314 may be implemented as conductive patches or patterns. The first antennas 311, 312, 313, and 314 may be antennas included in the antenna array. The first antennas 311, 312, 313, and 314 may be configured to radiate a signal output from the communication circuit 800 (e.g., the communication circuit 400 of FIG. 4), or receive a signal from the outside and transmit the received signal to the communication circuit 800. In FIG. 8A, the antenna array including the first antennas 311, 312, 313, and 314 is illustrated as a pattern in the form of one in horizontal and four in vertical (1×4), and may be implemented in various types of patterns without being limited to the pattern shown in FIG. 8A.

FIG. 8B illustrates the second surface 810-*b* of the first substrate 810. Referring to FIG. 8B, a PMIC configured to control power supply 335, an integrated circuit 820 configured to perform an operation of increasing the frequency of a signal to be radiated through the first antennas 311, 312, 313, and 314 or amplifying the signal to be radiated therethrough, a connector 337 connected to a communication processor (e.g., the first communication processor 212 of FIG. 2 or the second communication processor 214 of FIG. 2) and/or an application processor (e.g., the processor 120 of FIG. 1), or amplifiers 338-*a*, 338-*b*, 338-*c*, 338-*d*, 338-*e*, 338-*f*, 338-*g*, and 338-*h* configured to amplify a signal output from the integrated circuit 820 may be arranged on the second surface 810-*b* of the first substrate 810.

According to various embodiments of the disclosure, the communication circuit 800 may include the integrated circuit 820 and the amplifiers 338-*a*, 338-*b*, 338-*c*, 338-*d*, 338-*e*, 338-*f*, 338-*g*, and 338-*h*.

In FIG. 8B, the first surface 310-*a* and the second surface 310-*b* are shown as parallel to each other, but the relationship between the first surface 310-*a* and the second surface 310-*b* may be varied. For example, the first surface 310-*a* and the second surface 310-*b* may be shown as being vertical.

Figure 9:
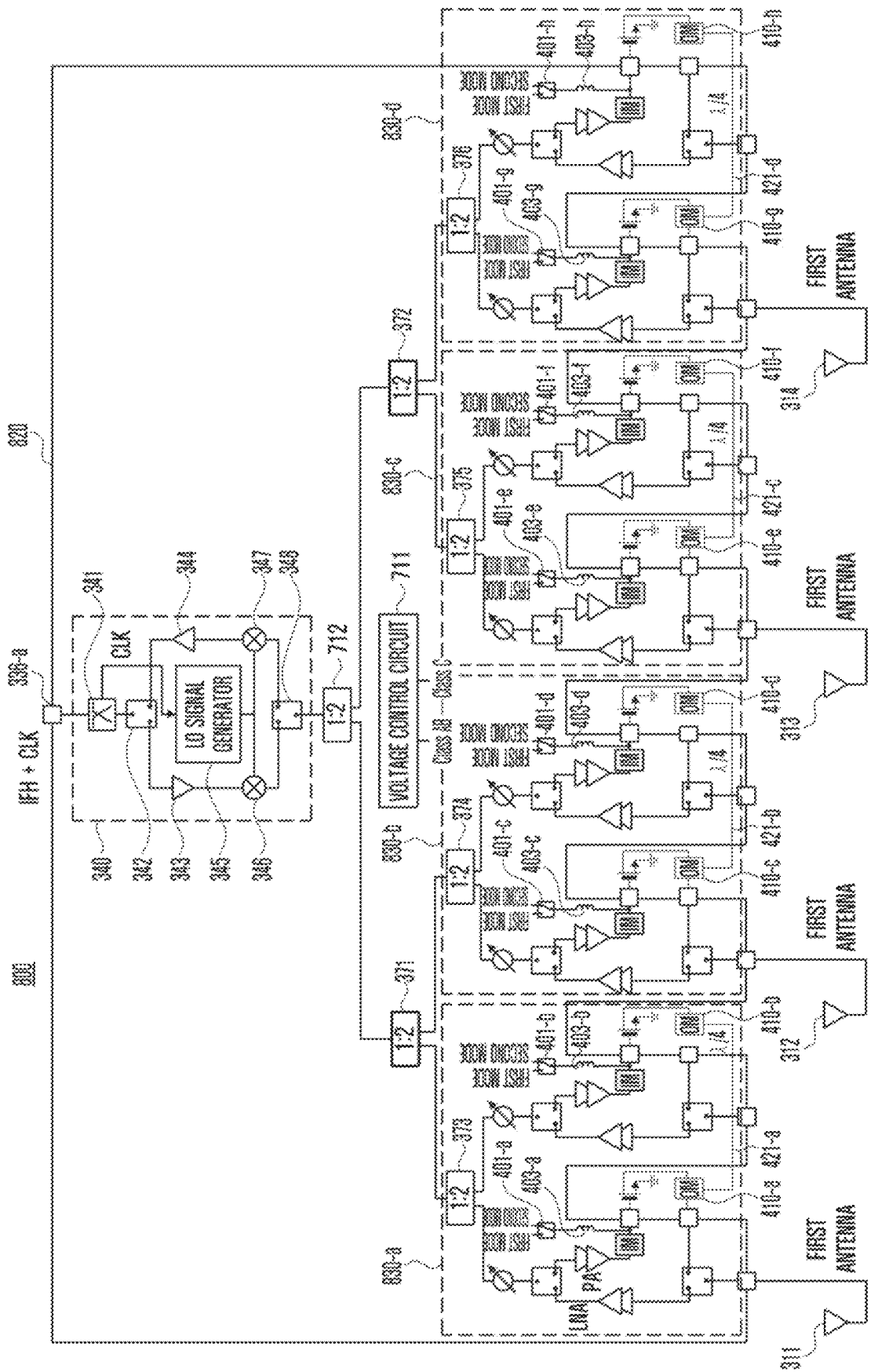
FIG. 9 is a diagram of a communication circuit of an electronic device according to various embodiments of the disclosure.

FIG. 9 is a diagram of a communication circuit of an electronic device according to various embodiments of the disclosure.

The parts 830-*a*, 830-*b*, 830-*c*, and 830-*d* of the communication circuit 800 illustrated in FIG. 9 may be implemented substantially the same as the parts 420-*a*, 420-*b*, 420-*c*, 420-*d* of the communication circuit 400 illustrated in FIG. 7A.

The communication circuit 800 illustrated in FIG. 9 has substantially the same structure as the communication circuit 400 illustrated in FIG. 7A, but the second antenna ports 387-*b*, 387-*d*, 387-*f*, and 387-*g* may be configured not to be connected to the antenna. In addition, the output terminals of the second amplifiers 338-*b*, 338-*d*, 338-*f*, and 338-*g* may be configured not to be connected to the fourth switches 385-*b*, 385-*d*, 385-*f*, and 385-*h*.

According to various embodiments of the disclosure, the first amplifier 338-*a* and the second amplifier 338-*b* may be electrically connected. The output terminal of the first amplifier 338-*a* and the output terminal of the second amplifier 338-*b* may be electrically connected through a transmission line 421 having a specified length. The signal amplified by the second amplifier 338-*b* may be transmitted to the first antenna 311 through the transmission line 421 and the third switch 385-*a*. For example, the transmission line 421 may have a length of about 0.25 times (¼ λ) the wavelength of the amplified signal in order to reduce the decrease in amplification efficiency caused by reduction of the impedance, which is viewed by the second amplifier 338-*b* (the output impedance of the second amplifier 338-*b*) when the communication circuit 400 operates in a first operation mode, at half of the impedance viewed by the second amplifier 338-*b* (the output impedance of the second amplifier 338-*b*) when the communication circuit 400 operates in a second operation mode.

The signal amplified by the first amplifier 338-*a* may be transmitted to the first antenna 311 through the third switch 385-*a*. The first antenna 311 may radiate the signal, which is amplified by the first amplifier 338-*a* and the second amplifier 338-*b*, thereby realizing radiation of a relatively large signal.

According to various embodiments of the disclosure, the communication circuit 400 may be configured to operate in one mode among a first operation mode, in which the first amplifier 338-*a* operates in a second mode and the second amplifier 338-*b* operates in a first mode, and a second operation mode in which the first amplifier 338-*a* is inactive and the second amplifier 338-*b* operates in a first mode. The first operation mode may be a mode in which a signal having a relatively strong output is radiated compared to the second operation mode.

According to various embodiments of the disclosure, the communication processor 214 may be configured to control the third switch 385-*a* so as to connect the first amplifier 338-*a* and the first antenna port 387-*a* to which the first antenna 311 is connected. In this case, the first reception chain 350-*a* may be disconnected from the first antenna 311 by the third switch 385-*a*.

According to various embodiments of the disclosure, the voltage control circuit 441 may apply a bias voltage to the first amplifier 338-*a* and/or the second amplifier 338-*b*. The voltage control circuit 441 may be configured to control the first mode selection circuit 401-*a* so that the first amplifier 338-*a* operates in a second mode (e.g., class C). The voltage control circuit 441 may be configured to control the first mode selection circuit 401-*a* so as to connect a circuit for applying a second bias voltage corresponding to the second mode to the first amplifier 338-*a*. The voltage control circuit 441 may be configured to control the second mode selection circuit 401-*b* so that the second amplifier 338-*b* operates in a first mode (e.g., class AB). The voltage control circuit 441 may be configured to control the second mode selection circuit 401-*b* so as to connect a circuit for applying a first bias voltage corresponding to the first mode to the second amplifier 338-*b*.

According to various embodiments of the disclosure, in the first operation mode, the first amplifier 338-*a* operating in the second mode may have a higher amplification gain than that of the second amplifier 338-*b* operating in the first mode.

According to various embodiments of the disclosure, the voltage control circuit 441 may be configured to control the second mode selection circuit 401-*b* so that the second amplifier 338-*b* operates in the first mode (e.g., class AB). The voltage control circuit 441 may be configured to control the second mode selection circuit 401-*b* so as to connect a circuit for applying the first bias voltage corresponding to the first mode to the second amplifier 338-*b*.

According to various embodiments of the disclosure, the second operation mode may be an operation mode in which the first amplifier 338-*a* is inactive and only the second amplifier 338-*b* is active.

Figure 10:
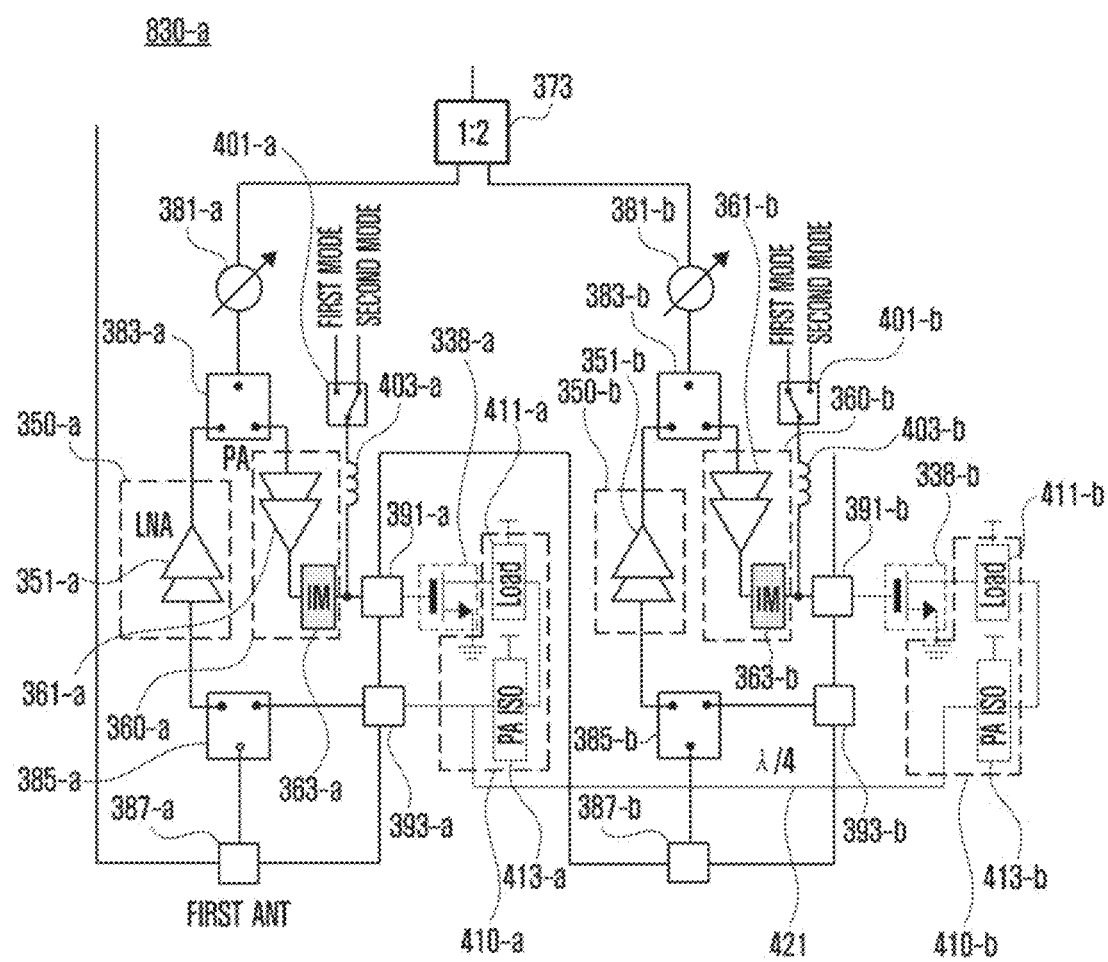
FIG. 10 is a diagram of a part of a communication circuit of an electronic device various embodiments embodiment of the disclosure.

FIG. 10 is a diagram of a part of a communication circuit of an electronic device according to various embodiments of the disclosure.

FIG. 10 is an enlarged view of parts 830-*a*, 830-*b*, 830-*c*, and 830-*d* of the communication circuit 800 shown in FIG. 9, and descriptions of elements substantially the same as those described in FIG. 5A will be omitted for clarity. Although a part 830-*a* of the communication circuit 800 is illustrated in FIG. 10, another part 830-*b* of the communication circuit may also include the configuration illustrated in FIG. 10.

According to various embodiments of the disclosure, due to the omission of the second antenna (e.g., the second antennas 321, 322, 323, 324 of FIG. 3A), there may be no connection of second antennas 321, 322, 323, 324 in the communication circuit 800. Since there in no connection of the second antennas 321, 322, 323, and 324 in the communication circuit 800, some elements between the fourth switch 385-*b* and the second amplifier 338-*b* may be omitted. According to an embodiment, a line connecting the fourth switch 385-*b* and the output terminal of the second amplifier 338-*b* may be omitted. According to an embodiment, a second switch isolation circuit (e.g., the second switch isolation circuit 415 of FIG. 5A) configured to prevent the signal amplified by the second amplifier 338-*b* from being transmitted to the fourth switch 385-*b*) may also not be included in the communication circuit 800. According to an embodiment, a first switch isolation circuit (e.g., the first switch isolation circuit 415-*a* of FIG. 5A) connected between the third switch 385-*a* and the output terminal of the third amplifier 338-*a* may not be included in the communication circuit 800.

The communication circuit 400 (e.g., the communication circuit 400 of FIG. 4A) according to various embodiments of the disclosure may include a first transmission chain (e.g., the first transmission chain 360-*a* of FIG. 4B) configured to output a first transmission signal through a first antenna (e.g., the first antennas 311, 312, 313, and 314 of FIG. 4A), a second transmission chain (e.g., the second transmission chain 360-*b* of FIG. 4B) configured to output a second transmission signal through a second antenna (e.g., the first antennas 321, 322, 323, and 324 of FIG. 4A), a first amplifier (e.g., the first amplifier 338-*a* of FIG. 4B) electrically connected to the first transmission chain 360-*a* and configured to amplify the first transmission signal output from the first transmission chain 360-*a*, and a second amplifier (e.g., the second amplifier 338-*b* of FIG. 4B) electrically connected to the second transmission chain 360-*b* and configured to amplify the second transmission signal output from the second transmission chain 360-*b*, where the second amplifier 338-*b* may be configured such that the output terminal of the second amplifier 338-*b* is connected to the output terminal of the first amplifier 338-*a* through the transmission line (e.g., the transmission lines 421-*a*, 421-*b*, 421-*c*, and 421-*d* of FIG. 4A) and output the second transmission signal received from the second transmission chain 360-*b* to the first antenna 311 through the transmission line 421-*a*.

The communication circuit 400 according to various embodiments of the disclosure may further include a voltage control circuit (e.g., the voltage control circuit of FIG. 4A) configured to control a bias voltage applied to the first amplifier 338-*a* and/or the second amplifier 338-*b*. The first amplifier 338-*a* and/or the second amplifier 338-*b* may be configured to operate in a first operation mode or a second operation mode having a lower output than the first operation mode, according to the strength of the first transmission signal and/or the second transmission signal.

In the communication circuit 400 according to various embodiments of the disclosure, the first operation mode may correspond to an operation mode in which the amplification gain of the first amplifier 338-*a* is configured to be greater than the amplification gain of the second amplifier 338-*b*.

In the communication circuit 400 according to various embodiments of the disclosure, the first amplifier 338-*a* may be in a class-C operation mode, and the second amplifier 338-*b* may be in a class-AB operation mode.

In the communication circuit 400 according to various embodiments of the disclosure, the second operation mode may correspond to an operation mode in which the first amplifier 338-*a* is configured to be in an inactive state and the second amplifier 338-*b* is configured to be in an active state.

In the communication circuit 400 according to various embodiments of the disclosure, the second amplifier 338-*b* may be in a class-AB operation mode.

In the communication circuit 400 according to various embodiments of the disclosure, the transmission line 421-*a* may have a length of ¼ of the wavelength of a signal transmitted through the transmission line 421-*a*.

The communication circuit 400 according to various embodiments of the disclosure may include a first reception chain (e.g., the first reception chain 350-*a* of FIG. 4B) configured to receive a signal through the first antenna 311, a first switch (e.g., the third switch 385-*a* of FIG. 4B) configured to electrically connect one of the first transmission chain 360-*a* and the first reception chain 350-*a* to the first antenna 311, and a first impedance matching circuit (e.g., the first output impedance matching circuit 410-*a* of FIG. 4B) connected between the first switch 385-*a* and the output terminal of the first amplifier 338-*a*, where the first impedance matching circuit 410-*a* is implemented to prevent a signal output from the second amplifier 338-*b* from being transmitted to the first amplifier 338-*a* while the first amplifier 338-*a* is inactive.

The communication circuit 400 according to various embodiments of the disclosure may include a second reception chain (e.g., the second reception chain 350-*b* of FIG. 4B) configured to receive a signal through the second antenna 321, a second switch (e.g., the fourth switch 385-*b* of FIG. 4B) configured to electrically connect one of the second transmission chain 360-*b* and the second reception chain 350-*b* to the second antenna 321, and a second impedance matching circuit (e.g., the second output impedance matching circuit 410-*b* of FIG. 4B) connected between the second switch 385-*b* and the output terminal of the second amplifier 338-*b*, where the second impedance matching circuit 410-*b* is implemented to prevent a signal output from the second amplifier 338-*b* from being transmitted to the second switch 385-*b* in a state in which the second transmission chain is not connected to the second antenna by the second switch 385-*b*.

In the communication circuit 400 according to various embodiments of the disclosure, the first amplifier 338-*a* may be configured such that the output terminal of the first amplifier 338-*a* is connected to the output terminal of the second amplifier 338-*b* through a transmission line 421-*a*, and the first transmission signal received from the first transmission chain 360-*a* is output to the second antenna 321 through the transmission line 421-*a*.

An electronic device (e.g., the electronic device 101 of FIG. 1) according to various embodiments of the disclosure may include a communication processor (e.g., the wireless communication module 192 of FIG. 1) and a communication circuit 400 connected to the communication module 192, where the communication circuit 400 includes a first substrate (e.g., the first substrate 310 of FIG. 3A) including a first surface (e.g., the first surface 310-*a* of FIG. 3A) on which one or more first antennas 311, 312, 313, and 314 are implemented and a second surface (e.g., the second surface 310-*b* of FIG. 7A) oriented in the opposite direction to the first surface 310-*b*, and second antennas 321, 322, 323, and 324 implemented on the first substrate 310, where the second surface 310-*b* includes an integrated circuit (e.g., the wireless communication integrated circuit 336 of FIG. 3A) including first transmission chains 360-*a*, 360-*c*, 360-*e*, and 360-*g* configured to output a first transmission signal through the first antennas 311, 312, 313, and 314 and second transmission chains 360-*b*, 360-*d*, 360-*f*, and 360*h* configured to output a second transmission signal through the second antenna, first amplifiers 338-*a*, 338-*c*, 338-*e*, and 338-*g* electrically connected to the first transmission chains 360-*a*, 360-*c*, 360-*e*, and 360-*g*, and configured to amplify the transmission signal output from the first transmission chains 360-*a*, 360-*c*, 360-*e*, and 360-*g*, and second amplifiers 338-*b*, 338-*d*, 338-*f*, and 338-*h* electrically connected to the second transmission chains 360-*b*, 360-*d*, 360-*f*, and 360-*h* and configured to amplify the second transmission signal output from the second transmission chains 360-*b*, 360-*d*, 360-*f*, and 360-*h*, and where the second amplifiers 338-*b*, 338-*d*, 338-*f*, and 338-*h* are configured such that the output terminal of the second amplifiers 338-*b*, 338-*d*, 338-*f*, and 338-*h* is connected to the output terminal of the first amplifiers 338-*a*, 338-*c*, 338-*e*, and 338-*g* through the transmission lines 421-*a*, 421-*b*, 421-*c*, and 421-*d*, and the second transmission signal received from the second transmission chain 360-*b*, 360-*d*, 360-*f*, and 360-*h* is output to the first antennas 311, 312, 313, and 314 through the transmission lines 421-*a*, 421-*b*, 421-*c*, and 421-*d*.

In the electronic device 101 according to various embodiments of the disclosure, the communication circuit 400 may further include a voltage control circuit 441 configured to control a bias voltage applied to the first amplifiers 338-*a*, 338-*c*, 338-*e*, and 338-*g* and/or the second amplifiers 338-*b*, 338-*d*, 338-*f*, and 338-*h*, and where the first amplifiers 338-*a*, 338-*c*, 338-*e*, and 338-*g* and/or the second amplifiers 338-*b*, 338-*d*, 338-*f*, and 338-*h* are configured to operate in one operation mode among a first operation mode or a second operation mode having an output lower than that of the first operation mode, according to the strength of the first transmission signal and/or the second transmission signal.

In the electronic device 101 according to various embodiments of the disclosure, the first operation mode may correspond to an operation mode in which the amplification gain of the first amplifiers 338-*a*, 338-*c*, 338-*e*, and 338-*g* is configured to be greater than the amplification gain of the second amplifiers 338-*b*, 338-*d*, 338-*f*, and 338-*h*.

In the electronic device 101 according to various embodiments of the disclosure, the first amplifiers 338-*a*, 338-*c*, 338-*e*, and 338-*g* are in a class-C operation mode, and the second amplifiers 338-*b*, 338-*d*, 338-*f*, and 338-*h* are in a class-AB operation mode.

In the electronic device 101 according to various embodiments of the disclosure, the second operation mode may correspond to an operation mode in which the first amplifiers 338-*a*, 338-*c*, 338-*e*, and 338-*g* are configured to be in an inactive state and the second amplifiers 338-*b*, 338-*d*, 338-*f*, and 338-*h* are configured to be in an active state.

In the electronic device 101 according to various embodiments of the disclosure, the second amplifiers 338-*b*, 338-*d*, 338-*f*, and 338-*h* may be configured to be in a class-AB operation mode.

In the electronic device 101 according to various embodiments of the disclosure, the transmission lines 421-*a*, 421-*b*, 421-*c*, and 421-*d* may have a length of ¼ of the wavelength of a signal transmitted through the transmission lines 421-*a*, 421-*b*, 421-*c*, and 421-*d*.

In the electronic device 101 according to various embodiments of the disclosure, the integrated circuit 336 may further include a first reception chain 350-*a* configured to receive a signal through the first antennas 311, 312, 313, and 314, and a first switch 385-*a* configured to electrically connect one of the first reception chain 350-*a* or the first transmission chains 360-*a*, 360-*c*, 360-*e*, and 360-*g* to the first antenna 311, and a first impedance matching circuit 410-*a* connected between the first switch 385-*a* and the output terminal of the first amplifiers 338-*a*, 338-*c*, 338-*e*, and 338-*g*, where the first impedance matching circuit 410-*a* is implemented to prevent a signal output from the second amplifiers 338-*b*, 338-*d*, 338-*f*, and 338-*h* from being transmitted to the first amplifiers 338-*a*, 338-*c*, 338-*e*, and 338-*g* in a state in which the first amplifiers 338-*a*, 338-*c*, 338-*e*, and 338-*g* are inactive.

In the electronic device according to various embodiments of the disclosure, the integrated circuit 336 may include a second reception chain 350-*b* configured to receive a signal through the second antennas 321, 322, 323, and 324, a second switch 385-*b* configured to electrically connect one of the second reception chains 350-*b* or the second transmission chains 360-*b*, 360-*d*, 360-*f*, and 360-*h* to the second antenna 321, and a second impedance matching circuit 410-*b* connected between the second switch 385-*b* and the output terminal of the second amplifiers 338-*b*, 338-*d*, 338-*f*, and 338-*h*, where the second impedance matching circuit 410-*b* is implemented to prevent a signal output from the second amplifiers 338-*b*, 338-*d*, 338-*f*, and 338-*h* from being transmitted to the second switch 385-*b* in a state in which the second transmission chains 360-*b*, 360-*d*, 360-*f*, and 360-*h* are not connected to the second antenna by the second switch 385-*b*.

In the electronic device 101 according to various embodiments of the disclosure, the first amplifiers 338-*a*, 338-*c*, 338-*e*, and 338-*g* may be configured such that the output terminal of the first amplifiers 338-*a*, 338-*c*, 338-*e*, and 338-*g* is connected to the output terminal of the second amplifiers 338-*b*, 338-*d*, 338-*f*, and 338-*h* through the transmission lines 421-*a*, 421-*b*, 421-*c*, and 421-*d*, and the first transmission signal received from the first transmission chain 360-*a*, 360*c*, 360*e*, and 360-*g* is output to the second antennas 321, 322, 323, and 324 through the transmission lines 421-*a*, 421-*b*, 421-*c*, and 421-*d*.

A communication circuit 400 according to various embodiments of the disclosure may include first transmission chains 360-*a*, 360-*c*, 360-*e*, and 360-*g* configured to output a first transmission signal through the first antennas 311, 312, 313, and 314, second transmission chains 360-*b*, 360-*d*, 360-*f*, and 360-*h* configured to output a second transmission signal, first amplifiers 338-*a*, 338-*c*, 338-*e*, and 338-*g* electrically connected to the first transmission chains 360-*a*, 360-*c*, 360-*e*, and 360-*g*, and configured to amplify a first transmission signal output from the first transmission chains 360-*a*, 360-*c*, 360-*e*, and 360-*g*, and second amplifiers 338-*b*, 338-*d*, 338-*f*, and 338-*h* electrically connected to the second transmission chains 360-*b*, 360-*d*, 360-*f*, and 360-*h*, and configured to amplify a second transmission signal output from the second transmission chains 360-*b*, 360-*d*, 360-*f*, and 360-*h*, where the second amplifiers 338-*b*, 338-*d*, 338-*f*, and 338-*h* are configured such that an output terminal of the second amplifiers 338-*b*, 338-*d*, 338-*f*, and 338-*h* is connected to an output terminal of the first amplifiers 338-*a*, 338-*c*, 338-*e*, and 338-*g* through the transmission lines 421-*a*, 421-*b*, 421-*c*, and 421-*d*, and the second transmission signal received from the second transmission chains 360-*b*, 360-*d*, 360-*f*, and 360-*h* is output to the first antennas 311, 312, 313, and 314 through the transmission lines 421-*a*, 421-*b*, 421-*c*, and 421-*d*.

A communication circuit and an electronic device including the communication circuit according to various embodiments of the disclosure may implement a structure in which a second amplifier connected to a second antenna, which is configured not to radiate a signal, is connected to a first antenna through a transmission line. Accordingly, the communication circuit and the electronic device including the communication circuit may be configured to amplify a signal to be transmitted, using a first amplifier connected to the first antenna configured to radiate a signal and the second amplifier connected to the second antenna configured not to radiate a signal. Accordingly, the communication circuit and the electronic device including the communication circuit may have high amplification efficiency.

A communication circuit and an electronic device including the communication circuit according to various embodiments of the disclosure may be configured to amplify a signal using a second amplifier during amplification of a low-output signal, and may be configured to amplify a signal using a first amplifier and the second amplifier during amplification of a high-output signal. Accordingly, the communication circuit and the electronic device including the communication circuit may implement amplification of a wide range of signals with guaranteed linearity.

A communication circuit and an electronic device including the communication circuit according to various embodiments of the disclosure may implement a circuit capable of increasing a second switch isolation between a second amplifier and a second switch connected to a second antenna. Accordingly, a signal amplified by the second amplifier may be transmitted to a first antenna through a transmission line, rather than transmitting to the second switch. Accordingly, the communication circuit and the electronic device including the communication circuit may have high amplification efficiency.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Where, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A communication circuit comprising:
   a first transmission chain configured to output a first transmission signal through a first antenna;
   a second transmission chain configured to output a second transmission signal through a second antenna;
   a first amplifier connected to the first transmission chain, and configured to amplify the first transmission signal output from the first transmission chain;
   a second amplifier connected to the second transmission chain, and comprising a second output terminal connected to a first output terminal of the first amplifier through a transmission line, the second amplifier being configured to:
      amplify the second transmission signal output from the second transmission chain, and
      output the amplified second transmission signal to the first antenna through the transmission line;
   a first switch configured to connect the first transmission chain or a first reception chain to the first antenna; and
   a first impedance matching circuit connected between the first switch and the first output terminal of the first amplifier, and configured to prevent a signal output from the second amplifier from being transmitted to the first amplifier while the first amplifier is inactive.

2. The communication circuit of claim 1, wherein the communication circuit further comprises a voltage control circuit configured to control a bias voltage applied to at least one of the first amplifier and the second amplifier, and
   wherein at least one of the first amplifier and the second amplifier is configured to operate in a first operation mode or a second operation mode having an output lower than that of the first operation mode, based on at least one of a strength of the first transmission signal and a strength of the second transmission signal.

3. The communication circuit of claim 2, wherein the first operation mode corresponds to an operation mode in which an amplification gain of the first amplifier is greater than an amplification gain of the second amplifier.

4. The communication circuit of claim 3, wherein the first amplifier is in a class-C operation mode, and
   wherein the second amplifier is in a class-AB operation mode.

5. The communication circuit of claim 2, wherein the second operation mode corresponds to an operation mode in which the first amplifier is in an inactive state and the second amplifier is in an active state.

6. The communication circuit of claim 5, wherein the second amplifier is in a class-AB operation mode.

7. The communication circuit of claim 1, wherein the transmission line has a length of ¼ of a wavelength of a signal transmitted through the transmission line.

8. The communication circuit of claim 1,
   wherein the first reception chain is configured to receive a signal through the first antenna.

9. The communication circuit of claim 1, wherein the communication circuit further comprises:
   a second reception chain configured to receive a signal through the second antenna;
   a second switch configured to connect the second transmission chain or the second reception chain to the second antenna; and
   a second impedance matching circuit connected between the second switch and the second output terminal of the second amplifier, and configured to prevent a signal output from the second amplifier from being transmitted to the second switch in a state in which the second transmission chain is not connected to the second antenna by the second switch.

10. The communication circuit of claim 1, wherein the first output terminal of first amplifier is connected to the second output terminal of the second amplifier through the transmission line, and
    wherein the first amplifier is further configured to output the first transmission signal received from the first transmission chain to the second antenna through the transmission line.

11. An electronic device comprising:
a communication processor; and
a communication circuit connected to the communication processor,
wherein the communication circuit comprises:
- a first substrate comprising:
  - a first surface on which at least one first antenna is implemented, and
  - a second surface oriented in a direction opposite to the first surface; and
- a second antenna provided on the first substrate,
wherein the second surface comprises:
  - an integrated circuit comprising a first transmission chain configured to output a first transmission signal through the at least one first antenna and a second transmission chain configured to output a second transmission signal through the second antenna;
  - a first amplifier connected to the first transmission chain, and configured to amplify the first transmission signal output from the first transmission chain; and
  - a second amplifier connected to the second transmission chain, and comprising a second output terminal connected to a first output terminal of the first amplifier through a transmission line, the second amplifier being configured to:
    - amplify the second transmission signal output from the second transmission chain, and
    - output the amplified second transmission signal to the at least one first antenna through the transmission line;
  - a first switch configured to connect the first transmission chain or a first reception chain to the first antenna; and
  - a first impedance matching circuit connected between the first switch and the first output terminal of the first amplifier, and configured to prevent a signal output from the second amplifier from being transmitted to the first amplifier while the first amplifier is inactive.

12. The electronic device of claim 11, wherein the communication circuit further comprises a voltage control circuit configured to control a bias voltage applied to at least one of the first amplifier and the second amplifier, and
wherein at least one of the first amplifier and the second amplifier is configured to operate in a first operation mode or a second operation mode having an output lower than that of the first operation mode, based on at least one of a strength of the first transmission signal and a strength of the second transmission signal.

13. The electronic device of claim 12, wherein the first operation mode corresponds to an operation mode in which an amplification gain of the first amplifier is greater than an amplification gain of the second amplifier.

14. The electronic device of claim 13, wherein the first amplifier is in a class-C operation mode, and
wherein the second amplifier is in a class-AB operation mode.

15. The electronic device of claim 12, wherein the second operation mode corresponds to an operation mode in which the first amplifier is in an inactive state and the second amplifier is in an active state.

* * * * *